United States Patent [19]

Nutt

[11] Patent Number: 5,322,986

[45] Date of Patent: Jun. 21, 1994

[54] METHODS FOR PREPARING POLYMER STRIPE WAVEGUIDES AND POLYMER STRIPE WAVEGUIDES PREPARED THEREBY

[75] Inventor: Alan C. G. Nutt, Rochester, N.Y.

[73] Assignee: Eastman Kodak Company, Rochester, N.Y.

[21] Appl. No.: 864,268

[22] Filed: Apr. 6, 1992

[51] Int. Cl.[5] .............................................. G02B 6/10
[52] U.S. Cl. ............................ 219/121.6; 219/121.69; 219/121.85
[58] Field of Search ....................... 156/643, 644, 668; 219/121.6, 121.69, 121.85; 385/132

[56] References Cited

U.S. PATENT DOCUMENTS

| | | |
|---|---|---|
| 4,414,059 | 11/1983 | Blum et al. |
| 4,481,049 | 11/1984 | Reichmanis et al. |
| 4,568,632 | 2/1986 | Blum et al. |
| 4,617,085 | 10/1986 | Cole, Jr. et al. |
| 4,770,739 | 9/1988 | Orvek et al. |
| 4,780,177 | 10/1988 | Wojnarowski et al. |
| 4,824,522 | 4/1989 | Baker et al. |
| 4,826,755 | 5/1989 | Garbassi et al. |
| 4,842,677 | 6/1989 | Wojnarowski et al. |
| 4,842,782 | 6/1989 | Portney et al. |
| 4,868,006 | 9/1989 | Yorkgitis et al. |
| 4,877,481 | 10/1989 | Fukuda et al. |
| 4,879,176 | 11/1989 | Ouderkirk et al. |
| 4,882,200 | 11/1989 | Liu et al. |
| 4,889,407 | 12/1989 | Markie et al. |
| 4,900,581 | 2/1990 | Stuke et al. |
| 4,915,981 | 4/1990 | Traskos et al. |
| 4,925,523 | 5/1990 | Braren et al. |
| 4,932,738 | 6/1990 | Haas et al. ..................... 385/2 |
| 4,935,094 | 6/1990 | Mixon et al. |
| 4,940,508 | 7/1990 | Chamouilian et al. |
| 4,941,093 | 7/1990 | Marshall et al. |
| 4,962,057 | 10/1990 | Epler et al. |
| 5,006,285 | 4/1991 | Thackara et al. ................ 385/3 |
| 5,106,211 | 4/1992 | Chiang et al. ................ 385/132 |

OTHER PUBLICATIONS

Krchnavek et al, "Laser Direct Writing of Channel Waveguides Using Spin on Polymers", Journal of Applied Physics 66(11), 1989, pp. 5156–5160.

Rochford, K. B. et al, "Febrication of integrated optical structures in polydiacetylene films by irreversible photoinduced bleaching", Applied Physics Letters, 55(12), Sep. 18, 1989, pp. 1161–1163.

Diemeer, M. B. J., et al, "Photoinduced Channel Waveguide Formation in Nonlinear Optical Polymers", Electronics Letters, 26(6), Mar. 15, 1990, pp. 379–380.

Franke, H. et al, "Photo-induced self-condensation, a technique for fabricating organic light-guide structures," SPIE vol. 651 Integrated Optical Circuit Engineering III, 1986, pp. 120–125.

Rochford, K. B. et al, "Waveguide channels and gratings in polydiacetylene films using photo-induced bleaching", SPIE vol. 1147 Nonlinear Optical Properties of Organic Materials II, 1989, pp. 279–284.

Brannon, J. H., "Micropatterning of surfaces by excimer laser projection", J. Vac. Sci, Technol. B7(5), Sep./Oct. 1989, pp. 1064–1071.

Srinvasan et al, "Excimer laser etching of polymers", J. Appl. Phys., 59(11), (1986) pp. 3861–3867.

Srinivasan et al, "Ultraviolet laser ablation of organic polymers", Chem. Rev., vol. 89, No. 6, (1989), pp. 1303–1316.

Krchnavek, R. R. et al, "Laser direct writing of optical waveguide structures" Apr. 28, 1988.

*Primary Examiner*—Thi Dang
*Attorney, Agent, or Firm*—Robert Luke Walker

[57] ABSTRACT

A method for preparing a poled polymer stripe waveguide comprising preparing a polymer waveguide blank, electric field poling the polymer waveguide blank, and photoablating the outline of the stripe waveguide in the waveguide blank. The invention also provides a method for preparing passive polymer stripe waveguides and non-linear optical and passive waveguides produced by the methods of the invention.

18 Claims, 13 Drawing Sheets

Cross-section

Cross-section

METHODS FOR PREPARING POLYMER STRIPE WAVEGUIDES AND POLYMER STRIPE WAVEGUIDES PREPARED THEREBY

BACKGROUND OF THE INVENTION

The present invention pertains to methods for producing non-linear optical waveguides and passive waveguides and more particularly pertains to methods for preparing non-linear optical (poled polymer) stripe waveguides and passive stripe waveguides and to the non-linear optical and passive stripe waveguides produced by those methods.

Optical stripe waveguides have been produced by subjecting a planar waveguide to a localized exchange or diffusion process. These "diffuse boundary" methods are commonly used for some semiconductors and ceramic materials such as $LiNbO_3$ and glass. Optical stripe waveguides can also be produced by patterned etching or by localized growth or deposition processes. These "ridge" type methods are commonly used for semiconductors and for ceramics such as $LiNbO_3$.

Organic polymers have been used in planar waveguides. Although some shortcomings are presented, such as changes in buffer layer and waveguide indices and permitivities with humidity, temperature and the like, there are a number of advantages in comparison to waveguide materials such as GaAs and $LiNbO_3$. Organic polymers can show a large electro-optic effect, reduced coupling losses with optical fibers due to differences in refractive indexes, compatibility with thin film processing techniques, relatively low costs, and relative ease in integration.

Organic polymer stripe waveguides are not readily prepared by techniques suitable for other materials. Organic polymers are soluble in the solvents and other materials used in a number of standard processes. Non-organized organic polymers for non-linear waveguides, that is, everything except Langmuir-Blodgett polymer films, must be electrically poled to become ordered and electro-optically active. These organic polymers generally have low glass transition temperatures ($T_g$) below about 160 degrees C. and after poling must not be heated above $T_g$.

Organic polymer stripe waveguides have been prepared by some alternative techniques. Krchnavek et al in an article entitled: "Laser Direct Writing of Channel Waveguides Using Spin on, Polymers", in the Journal of Applied Physics 66(11), 1989, pp. 5156–5160, disclose a method in which an organic polymer stripe waveguide is prepared by photon-induced polymerization using a UV curable polymer and a scanned Argon-ion laser. Comparable techniques are described in Rochford, K. B. et al, "Fabrication of integrated optical structures in polydiacetylene films by irreversible photoinduced bleaching", Applied Physics Letters, 55(12), 18 Sep. 1989, pp. 1161–1163; Diemeer, M. B. J. et al, "Photoinduced Channel Waveguide Formation in Non-linear Optical Polymers", Electronics Letters, 26(6), 15 Mar. 1990, pp. 379–380; Franke, H. et al, "Photo-induced self-condensation, a technique for fabricating organic lightguide structures", SPIE Volume 651 Integrated Optical Circuit Engineering III, 1986, pp. 120–125; Rochford, K. B. et al, "Waveguide channels and gratings in polydiacetylene films using photo-induced bleaching", SPIE Volume 1147 Nonlinear Optical Properties of Organic Materials II, 1989, pp. 279–284. These methods form the stripe waveguide by altering the polymer structure. This is a shortcoming where poled polymers are concerned, since electrically poled organic polymer waveguides have a chemical structure that must be maintained to maintain poling. U.S. Pat. No. 4,824,522 to Baker et al teaches a method for preparing a stripe organic waveguide by photolithography of a resist layer followed by reactive ion etching of an underlying organic polymer waveguide layer. All of these methods for producing stripe waveguides are slow, relatively complex and subject to a variety of technical limitations.

The use of a laser to remove material, that is, laser photoablation, is well known. Photoablation occurs when a material is excited with a high energy laser having a frequency greater than the bandgap of the material. Excited ions of the material are driven off and form by-products in the surrounding medium. Depending upon the wavelength and material, very little of the energy supplied by the laser is converted to heating the material that is not driven off. U.S. Pat. No. 4,414,059 to Blum et al described two different forms of laser photoablation. The first form utilizes relatively low intensity UV light at about 8 milliJoules per square centimeter ($mJ/cm^2$) and is temperature dependent and not strictly dependent on the wavelength of UV light used. This form of laser photoablation requires oxygen and is relatively slow, particularly for some materials. The second form, referred to as "ablative photodecomposition" in Blum et al, is described as being critically dependent on wavelength and power density, but not dependent on oxygen, temperature, or the nature of the organic material to be ablated.

UV lasers have been used to ablate organic polymers. Blum et al (cited above) and U.S. Pat. No. 4,617,085 to Cole, Jr. et al, teach the use of a laser to photoablate a pattern in a film of organic resist materials such as polymethylmethacrylate (PMMA). U.S. Pat. No. 4,889,407 to Markle et al teaches the use of laser photoablation on an optical fiber waveguide to form chambers for an indicator material. U.S. Pat. No. 4,842,782 to Portney et al teaches the use of a focused excimer laser and semi-transmissive mask for photoablating implantable opthalmic lenses from polymethylmethacrylate stock.

SUMMARY OF THE INVENTION

It is an object of the invention to provide an improved method for producing a poled polymer stripe waveguide which utilizes laser photoablation and is relatively simple and readily accomplished. In the broader aspects of the invention there is provided a method for preparing a poled polymer stripe waveguide comprising preparing a polymer waveguide blank, electric field poling the polymer waveguide blank, and photoablating the outline of the stripe waveguide in the waveguide blank. The invention also provides a method for preparing passive polymer stripe waveguides and non-linear optical and passive waveguides produced by the methods of the invention.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DESCRIPTION OF A SPECIFIC EMBODIMENT

In the methods of the invention, a polymer waveguide blank is prepared, electrical field poled, and photoablated in a selected pattern to provide a poled polymer stripe waveguide.

Figure 1:
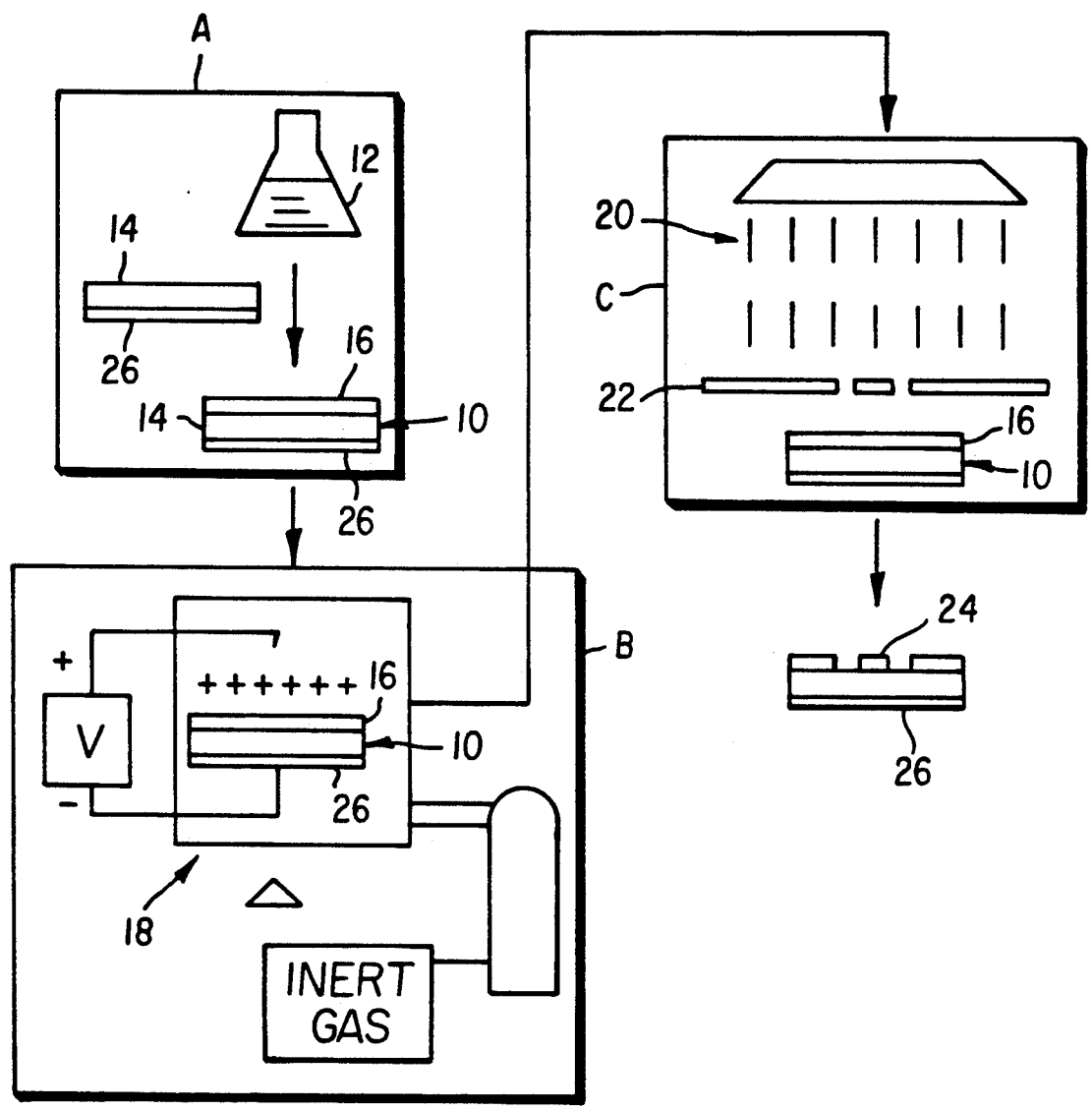
FIG. 1 is a schematic diagram of the method of the invention.
Figure 2:
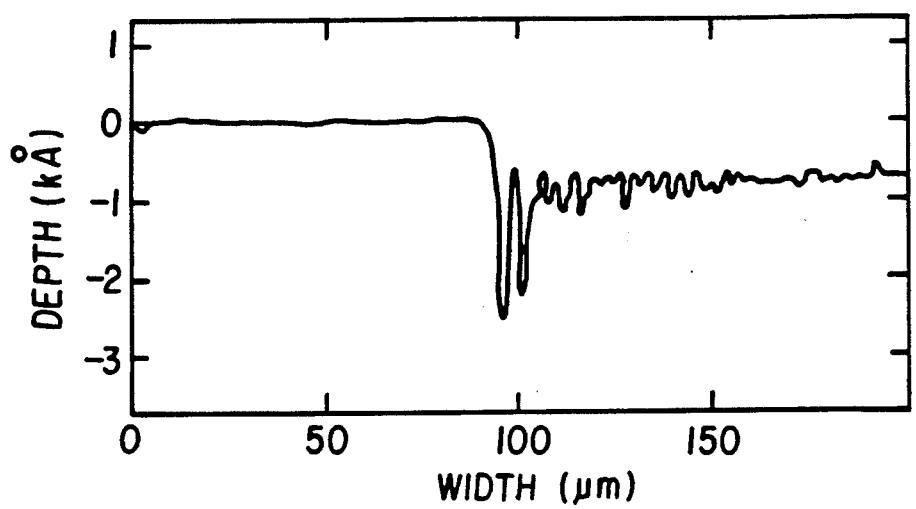
FIGS. 2-7 show profilometry scans of Examples 7-10, 16 and 20, respectively.
Figure 3:
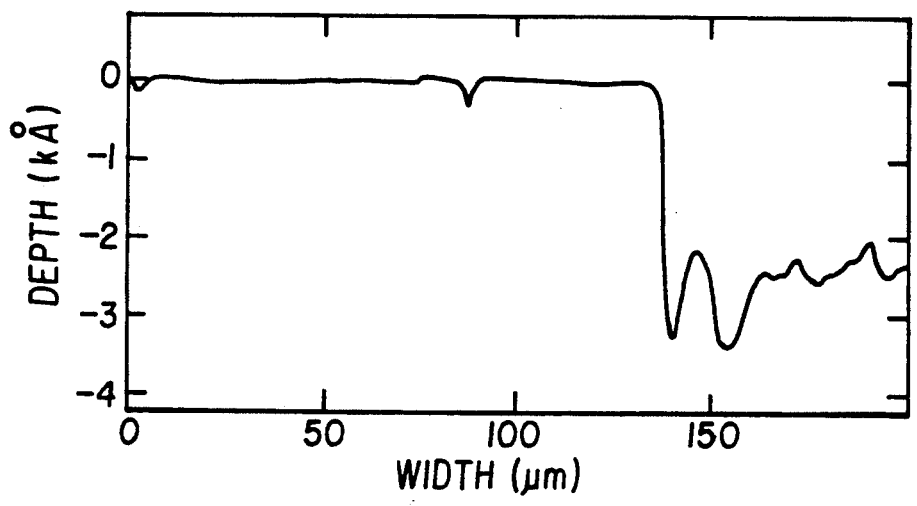
Figure 4:
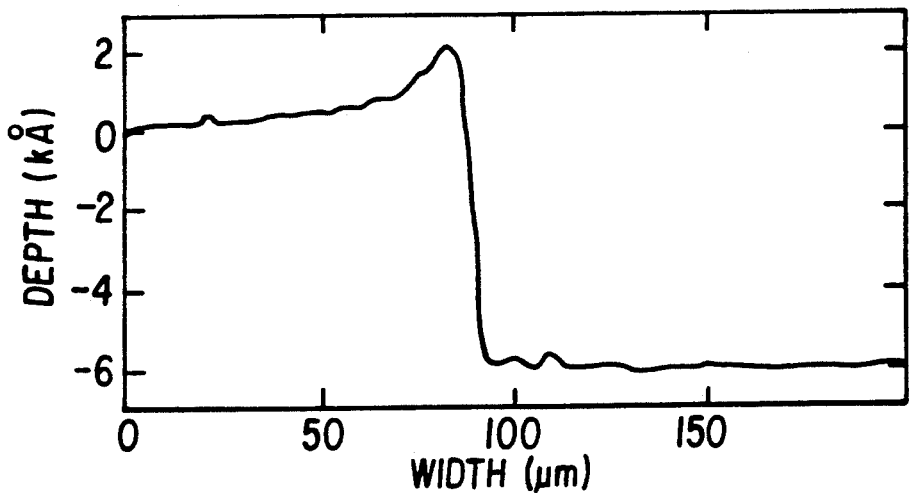
Figure 5:
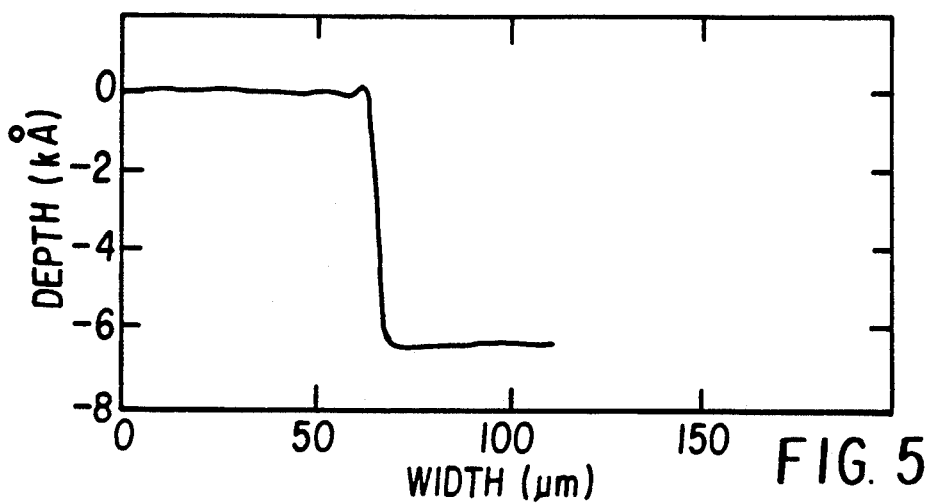

An embodiment of the method of the invention for preparing a poled polymer stripe waveguide is disclosed schematically in FIG. 1. In "A", a polymer waveguide blank 10 is prepared by coating a polymer solution 12 onto a base 14 and solidifying the solution to form a waveguide layer or guide member 16. The term "polymer waveguide blank" refers, in this embodiment of the invention, to a planar polymer waveguide, however, the methods of the invention and the term "polymer waveguide blank" are not limited to waveguides having a particular three dimensional shape, nor to waveguides having only the layers illustrated in "A". In "B", waveguide layer 16 is then electrically poled by heating waveguide blank in an inert atmosphere to just above the $T_g$ of the waveguide layer polymer, applying a potential across waveguide layer 16 until molecular alignment of waveguide polymer occurs, and then cooling to below $T_g$ while maintaining the electrical field. In FIG. 1 electrical poling is illustrated by a corona field poling apparatus 18, however, contact poling can also be used and may be preferred in some embodiments of the invention. In C, waveguide layer 16 is then exposed to a UV laser beam 20 through a shadow mask 22, which photoablates exposed portions of polymer layer 16 to provide poled polymer stripe waveguide 24. The term "stripe waveguide and equivalent terms used herein, refers to the stripe waveguide disclosed in FIG. 1, but are not limited to waveguides having a particular three dimensional shape, nor to waveguides having only the layers illustrated in "A". It is a novel and surprising result of the methods of the invention that electrical poling of waveguide layer 16 is not negated by the laser photoablation. Thus poled polymer stripe waveguide 24 can be used immediately after photoablation as a non-linear optical stripe waveguide without further processing. If further processing, such as addition of a buffer layer and additional electrode, is desired; then the non-linear optical properties of the polymer stripe waveguide can be tested prior to that additional processing. The method of the invention of patterning a waveguide layer is described above as step C of FIG. 1. In alternative embodiments of the invention, step B is deleted and waveguide layer is either optically passive or a Langmuir-Blodgett type film.

The material of waveguide layer must be capable of use in a waveguide and must be subject to photoablation in the method of the invention. In a preferred embodiment of the invention, waveguide layer is optically non-linear and can be constructed of any polymeric medium exhibiting a high (greater than $10^{-9}$ esu) second order polarization susceptibility and having organic molecular dipoles containing an electron donor moiety linked through a conjugated $\pi$ bonding system to an electron acceptor. The organic molecular dipole can itself form a part of the polymer as a repeating unit in the polymer backbone or, more commonly, is a pendant group. Alternatively, the organic molecular dipole can be present as a separate compound physically blended with a polymer binder. The polymer portion of the waveguide layer is not limited to linear polymers, but can include polymers with cross-linking.

A wide variety of organic molecular dipoles suitable for use in the practice of this invention as well as polymers, forming a part of the organic molecular dipoles or employed as separate binders, are known. Examples of such materials are disclosed in the following: Williams, "Organic Polymeric and Non-Polymeric Materials with Large Optical Nonlinearities", *Angew. Chem.* Int. Ed. Engl. 23 (1984), pp. 690–703; Garito, U.S. Pat. No. 4,536,450; European Patent Application 0,186,999, published Jul. 9, 1986; Zyss, "Nonlinear Organic Materials for Integrated Optics", *Journal of Molecular Electronics*, Vol. 1, pp. 25–45; Choe, U.S. Pat. No. 4,603.187; Choe et al U.S. Pat. No. 4,707,305; Choe et al, U.S. Pat. No. 4,667,042; Choe et al, U.S. Pat. No. 4,650,609; Choe, U.S. Pat. No. 4,579,915; DeMartino, U.S. Pat. No. 4,720,355; Choe et al, U.S. Pat. No. 4,732,783; Kobayashi et al, Chemical Physics Letters, Vol. 121, No. 4,5, pp. 356–360, Nov. 15, 1985; DeMartino, U.S. Pat. No. 4,766,171; DeMartino et al, U.S. Pat. No. 4,694,066; DeMartino et al, U.S. Pat. No. 4,835,235; Choe, U.S. Pat. No. 4,711,532; Choe, U.S. Pat. 4,694,048; Choe, U.S. Pat. No. 4,703,096; Choe, U.S. Pat. No. 4,719,28; Milverton et al, U.S. Pat. No. 4,818,616; Leslie et al, U.S. Pat. No. 4,796,976; Choe, U.S. Pat. No. 4,804,255; Leslie, U.S. Pat. No. 4,801,659; Leslie, U.S. Pat. No. 4,807,968; Teng et al, U.S. Pat. No. 4,775,215, issued Oct. 4, 1988; Robin et al, U.S. Pat. No. 4,794,045; Gillberg-LaForce et al, U.S. Pat. No. 4,728,576; DeMartino, U.S. Pat. No. 4,779,961; DeMartino, U.S. Pat. No. 4,757,130; Choe, U.S. Pat. No. 4,824,219; Ulman et al, U.S. Pat. No. 4,792,208; DeMartino et al, U.S. Pat. No. 4,808,332; Robello et al, U.S. Pat. No. 4,796,971; DeMartino et al, U.S. Pat. No. 4,822,865; DeMartino et al, U.S. Pat. No. 4,801,670; Robello, U.S. Pat. No. 4,900,127; Scozzafava et al, U.S. Pat. No. 4,886,339; Schildkraut et al, U.S. Pat. No. 4,971,426. Conventional details of the construction of the waveguide layer in the form of a polymeric layer, including layer thickness, are also taught in the foregoing citations.

In a particular embodiment of the invention, the organic nonlinear waveguide layer is formed by poling linear condensation and vinyl polymers including noncentrosymmetric molecular dipoles as pendant or backbone groups. The molecular dipoles include an electron donor moiety, such as an amino, oxy, or thio group, linked through a conjugated $\pi$ bonding system to an electron acceptor moiety, such as a sulfonyl, cyano, or nitro group, to permit oscillation of the molecular dipole between a lower polarity ground state and a higher polarity excited state. A preferred conjugated $\pi$ bonding system is provided by a 4,4'-stilbene or 4,4'-diazobenzene linkage between the electron acceptor or electron donor moiety. The molecular dipole can be immobilized by a separate crosslinked polymeric binder, linked to the polymer backbone through the electron donor or acceptor moiety, or incorporated in the polymer backbone by linkages through both the electron acceptor and donor moieties.

Table I is illustrative of specific molecular dipole monomers suitable for producing condensation polymer waveguide layers that can then be poled to form nonlinear optical waveguide layers:

Table I

4'(N-[5-(Methoxycarbonyl)pentyl]-N-methyl-amino)-4-(6-hydroxyhexyl)sulfonylazobenzene
4'-(N-[5-(Butoxycarbonyl)pentyl]-N-methyl-amino)-4-(6-hydroxyhexyl)sulfonylazobenzene
4'-(N-[5-(Methoxycarbonyl)pentyl]-N-methyl-amino)-4-(6-hydroxyhexyl)sulfonylstilbene
4'-(N-]5-(Butoxycarbonyl)pentyl]-N-methyl-amino)-4-(6-hydroxyhexyl)sulfonylstilbene
4'-[N-(Methoxycarbonyl)methyl-N-methylamino]-4-(6-hydroxyhexyl)sulfonylazobenzene
4'-[N-(Ethoxycarbonyl)methyl-N-methylamino]-4-(6-hydroxyhexyl)sulfonylazobenzene
4'-[N-(Methoxycarbonyl)methyl-N-methylamino]-4-(6-hydroxyhexyl)sulfonylstilbene
4'-[N-(Ethoxycarbonyl)methyl-N-methylamino]-4-(6-hydroxyhexyl)sulfonylstilbene
4'-[N-(6-Hydroxyhexyl)-N-methylamino]-4-[2-(methoxycarbonyl)ethyl]sulfonylazobenzene
4'-[N-(6-Hydroxyhexyl)-N-methylamino]-4-[2-(ethoxycarbonyl)ethyl]sulfonylazobenzene
4'-[N-(6-Hydroxyhexyl)-N-methylamino]-4-[2-(methoxycarbonyl)ethyl]sulfonylstilbene
4'-[N-(6-Hydroxyhexyl)-N-methylamino]-4-[2-(ethoxycarbonyl)ethyl]sulfonylstilbene
4'-[N-(2-Hydroxyethyl)-N-methylamino]-4-[2-(methoxycarbonyl)ethyl]sulfonylazobenzene
4'-[N-(2-Hydroxyethyl)-N-methylamino]-4-[2-(ethoxycarbonyl)ethyl]sulfonylazobenzene
4'-[N-(2-Hydroxyethyl)-N-methylamino]-4-[2-(methoxycarbonyl)ethyl]sulfonylstilbene
4'-[N-(2-Hydroxyethyl)-N-methylamino]-4-[2-(ethoxycarbonyl)ethyl]sulfonylstilbene
4'-[N-(2-Hydroxyhexyl)-N-methylamino]-4-]5(methoxycarbonyl)pentyl]sulfonylazobenzene
4'-[N-(2-Hydroxyhexyl)-N-methylamino]-4-]5(methoxycarbonyl)pentyl]sulfonylstilbene
4'-(4-Hydroxy-1-piperidinyl)-4-[2-(methoxycarbonyl)ethyl]sulfonylazobenzene
4'-(4-Hydroxy-1-piperidinyl)-4-[2-(methoxycarbonyl)ethyl]sulfonylstilbene Table II is illustrative of specific molecular dipole monomers suitable for producing vinyl polymer waveguide layers that can be poled to form nonlinear optical waveguide layers:

Table II

4'-[N-(2-acryloyloxyethyl-N-methylamino]-4-methylsulfonylstilbene
4'-[N-(2-methacryloyloxyethyl-N-methyl-amino]-4-methylsulfonylstilbene
4'-[N-(6-acryloyloxyhexyl)-N-methylamino]-4-methylsulfonylstilbene
4'-[N-(6-methacryloyloxyhexyl)-N-methylamino]-4-methylsulfonylstilbene
4'-[4-acryloyloxy-1-piperidyl]-4-methylsulfonylstilbene
4'-[4-methacryloyloxy-1-piperidyl]-4-methylsulfonylstilbene
4'-[N-(2-acryloyloxyethyl)-N-methylamino]-4-phenylsulfonylstilbene
4'-[N-(2-methacryloyloxyethyl)-N-methylamino]-4-phenylsulfonylstilbene
4'-[N-(6-acryloyloxyhexyl)-N-methylamino]-4-phenylsulfonylstilbene
4'-[N-(6-methacryloyloxyhexyl)-N-methylamino]-4-phenylsulfonylstilbene
4'-[4-acryloyloxy-1-piperidyl]-4-phenylsulfonylstilbene
4'-[4-methacryloyloxy-1-piperidyl]-4-phenylsulfonylstilbene
4'-[N-(2-acryloyloxyethyl)-N-methylamino]-4-(R-2-methylbutyl)sulfonylstilbene
4'-[N-(2-methacryloyloxyethyl)-N-methylamino]-4-(R-2-methylbutyl)sulfonylstilbene
4'-[N-(6-acryloyloxyethyl)-N-methylamino]-4-(R-2-methylbutyl)sulfonylstilbene
4'-[N-(6-methacryloyloxyethyl)-N-methylamino]-4-(R-2-methylbutyl)sulfonylstilbene
4'-[4-acryloyloxy-1-piperidyl]-4-(R-2-methylbutyl)sulfonylstilbene
4'-[4-methacryloyloxy-1-piperidyl]-4-(R-2-methylbutyl)sulfonylstilbene
4'-(2-acryloyloxyethoxy)-4-methylsulfonylstilbene
4'-(2-methacryloyloxyethoxy)-4-methylsulfonylstilbene
4'-(6-acryloyloxyhexoxy)-4-methylsulfonylstilbene
4'-(6-methacryloyloxyhexoxy)-4-methylsulfonylstilbene
4'-(2-acryloyloxyethoxy)-4-phenylsulfonylstilbene
4'-(2-methacryloyloxyethoxy)-4-phenylsulfonylstilbene
4'-(6-acryloyloxyhexoxy)-4-phenylsulfonylstilbene
4'-(6-methacryloyloxyhexoxy)-4-phenylsulfonylstilbene
4'-(2-acryloyloxyethoxy)-4-(R-2-methylbutyl)sulfonylstilbene
4'-(2-methacryloyloxyethoxy)-4-(R-2-methylbutyl)sulfonylstilbene
4'-(6-acryloyloxyhexoxy)-4-(R-2-methylbutyl)sulfonylstilbene
4'-(6-methacryloyloxyhexoxy)-4-(R-2-methylbutyl)sulfonylstilbene
4'-(2-acryloyloxyethylthio)-4-methylsulfonylstilbene
4'-(2-methacryloyloxyethylthio)-4-methylsulfonylstilbene
4'-(6-acryloyloxyhexylthio)-4-methylsulfonylstilbene
4'-(6-methacryloyloxyhexylthio)-4-methylsulfonylstilbene
4'(2-acryloyloxyethylthio)-4-phenylsulfonylstilbene
4'(2-methacryloyloxyethylthio)-4-phenylsulfonylstilbene
4'-(6-acryloyloxyhexylthio)-4-phenylsulfonylstilbene
4'-(6-methacryloyloxyhexylthio)-4-phenylsulfonylstilbene 4'-(2-acryloyloxyethylthio)-4-(R-2-methylbutyl)sulfonylstilbene
4'-(2-methacryloyloxyethylthio)-4-(R-2-methylbutyl)-sulfonylstilbene
4'-(6-acryloyloxyhexylthio)-4-(R-2-methylbutyl)sulfonylstilbene
4'-(6-methacryloyloxyhexylthio-4-(R-2-methylbutyl)-sulfonylstilbene
4'-dimethylamino-4-(6-acryloyloxyhexyl)sulfonylstilbene
4'-dimethylamino-4-(6-methacryloyloxyhexyl)sulfonylstilbene
4'-(1-pyrrolidino)-4-(6-acryloyloxyhexyl)sulfonylstilbene
4'-(1-pyrrolidino)-4-(6-methacryloyloxyhexyl)sulfonylstilbene
4'-[N-(R-2-methylbutyl)-N-methylamino]-4-(6-acryloyloxyhexyl)sulfonylstilbene
4'-[N-(R-2-methylbutyl)-N-methylamino]-4-(6methacryloyloxyhexyl)sulfonylstilbene
4'-methoxy-4-(6-acryloyloxyhexyl)sulfonylstilbene
4'-methoxy-4-(6-methacryloyloxyhexyl)sulfonylstilbene
4'(R-2-methylbutoxy)-4-(6-acryloyloxyhexyl)sulfonylstilbene
4'(R-2-methylbutoxy)-4-(6-methacryloyloxyhexyl)sulfonylstilbene
4'-methylthio-4-(6-acryloyloxyhexyl)sulfonylstilbene
4'-methylthio-4-(6methacryloyloxyhexyl)sulfonylstilbene
4'-(R-2-methylbutylthio)-4-(6-acryloyloxyhexyl)sulfonylstilbene
4'-(R-2-methylbutylthio)-4-(6-methacryloyloxyhexyl)-sulfonylstilbene
4'-[N-(2-acryloyloxyethyl)-N-methylamino]-4-methylsulfonylazobenzene
'-[N-(2-methacryloyloxyethyl)-N-methylamino]-4-methylsulfonylazobenzene
4'[N-(6-acryloyloxyhexyl)-N-methylamino]-4-methylsulfonylazobenzene
4'[N-(6-methacryloyloxyhexyl)-N-methylamino]-4-methylsulfonylazobenzene
4'-[4-acryloyloxy-1-piperidyl]-4-methylsulfonylazobenzene
4'-[4-methacryloyloxy-1-piperidyl]-4-methylsulfonylazobenzene
4'-[N-(2-acryloyloxyethyl)-N-methylamino]-4-phenylsulfonylazobenzene
4'-[N-(2-methacryloyloxyethyl)-N-methylamino]-4-phenylsulfonylazobenzene
4'-[N-(6-acryloyloxyhexyl)-N-methylamino]-4-phenylsulfonylazobenzene
4'-[N-(6-methacryloyloxyhexyl)-N-methylamino]-4-phenylsulfonylazobenzene
4'-[4-acryloyloxy-1-piperidyl]-4-phenylsulfonylazobenzene
4'-[4-methacryloyloxy-1-piperidyl]-4-phenylsulfonylazobenzene
4'-[N-(2-acryloyloxyethyl)-N-methylamino]-4-(R-2-methylbutyl)sulfonylazobenzene
4'-[N-(2-methacryloyloxyethyl)-N-methylamino]-4-(R-2-methylbutyl)sulfonylazobenzene
4'-[N-(6-acryloyloxyhexyl)-N-methylamino]-4-(R-2-methylbutyl)sulfonylazobenzene
4'-[N-(6-methacryloyloxyhexyl)-N-methylamino]-4-(R-2-methylbutyl)sulfonylazobenzene
4'-[4-acryloyloxy-1-piperidyl]-4-(R-2-methylbutyl)sulfonylazobenzene
4'-[4-methacryloyloxy-1-piperidyl]-4-(R-2-methylbutyl)sulfonylazobenzene
4'-(2-acryloyloxyethoxy)-4-methylsulfonylazobenzene
4'-(2-methacryloyloxyethoxy)-4-methylsulfonylazobenzene
4'-(6-acryloyloxyhexoxy)-4-methylsulfonylazobenzene
4'-(6-methacryloyloxyhexoxy)-4-methylsulfonylazobenzene
4'-(2-acryloyloxyethoxy)-4-phenylsulfonylazobenzene
4'-(2-methacryloyloxyethoxy)-4-phenylsulfonylazobenzene
4'-(6-acryloyloxyhexoxy)-4-phenylsulfonylazobenzene
4'-(6-methacryloyloxyhexoxy)-4-phenylsulfonylazobenzene
4'-(2-acryloyloxyethoxy)-4-(R-2-methylbutyl)sulfonylazobenzene
4'-(2-methacryloyloxyethoxy)-4-(R-2-methylbutyl)sulfonylazobenzene
4'-(6-acryloyloxyhexoxy)-4-(R-2-methylbutyl)sulfonylazobenzene
4'-(6-methacryloyloxyhexoxy)-4-(R-2-methylbutyl)sulfonylazobenzene
4'-(2-acryloyloxyethylthio)-4-methylsulfonylazobenzene
4'-(2-methacryloyloxyethylthio)-4-methylsulfonylazobenzene
4'-(6-acryloyloxyhexylthio)-4-methylsulfonylazobenzene
4'-(6-methacryloyloxyhexylthio)-4-methylsulfonylazobenzene
4'(2-acryloyloxyethylthio)-4-phenylsulfonylazobenzene
4'(2-methacryloyloxyethylthio)-4-phenylsulfonylazobenzene
4'-(6-acryloyloxyhexylthio)-4-phenylsulfonylazobenzene
4'-(6-methacryloyloxyhexylthio)-4-phenylsulfonylazobenzene
4'(2-acryloyloxyethylthio)-4-(R-2-methylbutyl)sulfonylazobenzene
4'(2-methacryloyloxyethylthio)-4-(R-2-methylbutyl)-sulfonylazobenzene
4'-(6-acryloyloxyhexylthio)-4-(R-2-methylbutyl)sulfonylazobenzene
4'-(6-methacryloyloxyhexylthio)-4-(R-2-methylbutyl)-sulfonylazobenzene
4'-dimethylamino-4-(2-acryloyloxyethyl)sulfonylazobenzene
4'-dimethylamino-4-(2-methacryloyloxyethyl)sulfonylazobenzene
4'-dimethylamino-4-(6acryloyloxyhexyl)sulfonylazobenzene
4'-dimethylamino-4-(6-methacryloyloxyhexyl)sulfonylazobenzene
4'-(1-pyrrolidino)-4-(2-acryloyloxyethyl)sulfonylazobenzene
4'-(1-pyrrolidino)-4-(2-methacryloyloxyethyl)sulfonylazobenzene
4'-(1-pyrrolidino)-4-(6-acryloyloxyhexyl)sulfonylazobenzene
4'-(1-pyrrolidino)-4-(6-methacryloyloxyhexyl)sulfonylazobenzene
4'-dimethylamino-4-(6acryloyloxyhexyl)sulfonylazobenzene
4'-dimethylamino-4-(6-methacryloyloxyhexyl)sulfonylazobenzene
4'-(1-pyrrolidino-4-(6-acryloyloxyhexyl)sulfonylazobenzene 4'-(1-pyrrolidino-4-(6-methacryloyloxyhexyl)sulfonylazobenzene 4'[N-(R-2-methylbutyl)-N-methylamino]-4-(6-acryloyloxyhexyl)sulfonylazobenzene 4'[N-(R-2-methylbutyl)-N-methylamino]-4-(6-methacryloyloxyhexyl)sulfonylazobenzene 4'-methoxy-4-(6-acryloyloxyhexyl)sulfonylazobenzene 4'-methoxy-4-(6-methacryloyloxyhexyl)sulfonylazobenzene 4'-(R-2-methylbutoxy)-4-(6-acryloxyhexyl)sulfonylazobenzene 4'-(R-2-methylbutoxy)-4-(6-methacryloxyhexyl)sulfonylazobenzene 4'-methylthio-4-(6-acryloxyhexyl)sulfonylazobenzene 4'-methylthio-4-(6-methacryloxyhexyl)sulfonylazobenzene 4'-(R-2-methylbutylthio)-4-(6-acryloxyhexyl)sulfonylazobenzene 4'-(R-2-methylbutylthio)-4-(6-acryloxyhexyl)sulfonylazobenzene 1-(9-julolidinyl)-2-[4-(6-acryloyloxyhexylsulfonyl)-phenyl]ethene 1-(1-butyl-5-indolinyl)-2-[4-(6-methacryloyloxyhexylsulfonyl)phenyl]diimine The following are illustrative of typical vinyl addition monomers that can be copolymerized with the vinyl molecular dipole monomers of Table II, if desired, or can be polymerized without the vinyl molecular dipole monomers of Table II to provide passive waveguides: methyl acrylate, ethyl acrylate, butyl acrylate, t-butyl acrylate, methyl chloroacrylate, methyl methacrylate, ethyl methacrylate, butyl methacrylate, t-butylmethacrylate, styrene, 4-methylstyrene, a-methylstyrene, 4-t-butylstyrene, 4-hydroxystyrene, 4-methoxystyrene, 4-acetoxystyrene, 2-vinylnaphthylene, acrylonitrile, acrylamide, n-phenylmaleimide, n-vinylpyrrolidone, vinylacetate, vinylchloride, butadiene, isoprene, and chloroprene. For nonlinear optical waveguides, the vinyl molecular dipole monomers can form 50 to 100 percent of the repeating units of the polymer, with vinyl addition monomers forming the balance of the repeating units of the polymer. An optical buffer layer (not shown) of passive waveguide polymer can be deposited over a nonlinear optical waveguide layer if desired. Both layers are then ablated to produce polymer stripe waveguide. Suitable materials are the same as those indicated above for a passive waveguide.

The passive waveguide layer or an optical buffer layer can also be formed of one or more amorphous low molecular weight aromatic compounds. By "amorphous" it is meant that there is substantially no crystallinity in the layer or microstructure attributed to the coating process. This can be determined by visual inspection under a microscope; by Raman spectroscopic techniques; or by the observation of scattered light from the modulator. The term "low molecular weight" is employed to designate compounds having a molecular weight below about 1000. In other words, film forming polymers, which typically have a molecular weight of at least 5000, are excluded.

Low molecular weight aromatic compounds are useful in the present invention are solids at room temperature. Low molecular weight aromatic compounds having a vapor pressure sufficiently high to permit vacuum deposition and having a glass transition temperature of greater than about 50° C. are preferred. Glass transition temperature is measured using conventional techniques, such as differential scanning calorimetry of amorphous bulk material that is substantially free from residual solvents and decomposition products.

The low molecular weight aromatic compounds contain at least one aromatic carbocyclic or heterocyclic ring. The compounds can be the "multicyclic aromatic nucleus" compounds described in U.S. Pat. No. 4,499,165 or derivatives thereof. A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole, oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidene-bis(2,6-dibromophenol); 3',3'',5',5''-tetrabromo-phenolphthalein, 9,9-bis(4-aminophenyl)fluorene, phenylindandiols; 1,1'-spirobiindandiols, 1,1'-spirobiindandi-amines, 2,2'-spirobichromans; 7,7-dimethyl-7H-dibenzo-[c,h]xanthenediol; 9,9-dimethylxanthene-3,6-bis(oxyacetic acids); 4,4'-(3-phenyl-1-indanylidene)diphenol and other bisphenols; 9-phenyl-3-oxo-2,6,7-trihydroxy-xanthene; and the like.

Useful multicyclic aromatic nuclei compounds are:

A. The phenylindan diols disclosed in *Research Disclosure*, Item No. 11833, February 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous), C. The 1,1'-spirobiindan-5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclosure*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975, J. The sulfonyldibenzoic acids disclosed in *Research Disclosure*, Item No. 14016, December 1975, K. The polycyclic norbornanes of *Research Disclosure*, Item No. 9207, December 1971, and L. The 1,2,3,4-tetrahydronaphthalenes disclosed in *Research Disclosure*, Item No. 13570, July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

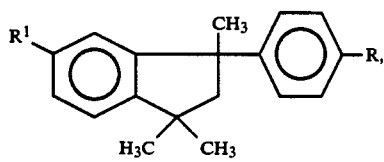

in which R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae $-NHCOR^2$ and $-CONR^2R^3$ respectively, wherein $R^2$ and $R^3$ are independently selected from the group consisting of unsubstituted and substituted aliphatic, aromatic and heterocyclic groups such that the molecular weight of the compound is less than about 1000. Useful aliphatic $R^2$ and $R^3$ groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl. Useful aromatic $R^2$ and $R^3$ groups include phenyl and naphthyl and substituted aromatic such as aromatic substituted with halogen, alkyl, cyano, alkoxy and hydroxy such as 4-methoxy phenyl and 3,4-dichloro phenyl. Useful heterocyclic $R^2$ and $R^3$ groups include pyridyl, furanyl, thiophenyl, quinolyl and piperidyl; and substituted heterocyclic such as heterocyclic substituted with alkyl, halogen and alkoxy such as 5-butyl-pyridyl. Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

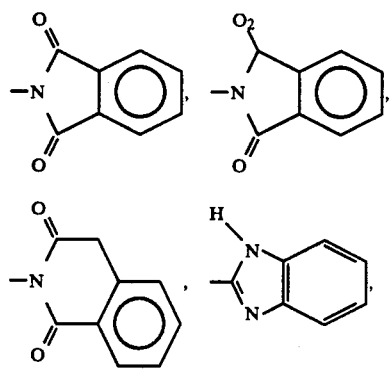

-continued

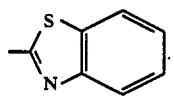

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane. Where R and $R^1$ are different, mixtures of the side chain precursors are used and the compound isolated by liquid chromotography. In preferred embodiments, R and $R^1$ are the same and there is no need to resolve the mixture. The similar carbamoyl compounds are made in a similar manner starting from the phenylindandicarboxylic acid, converting it to the corresponding acid chloride and reacting the acid chloride with the desired amine.

Table III lists R substituents, refractive indexes, and glass transition temperatures for exemplary phenylindan compounds, which have the general structure

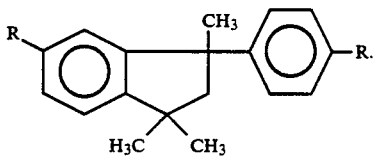

All of the refractive indices reported in this table and subsequently were measured at 632 nm.

TABLE III

| R | Refractive index | Tg (in C) |
|---|---|---|
| —CONH | 1.613 | 110 |
| —NHCO—⟨phenyl⟩—OCH₃ | 1.630 | 114 |
| —NHCO—⟨phenyl⟩—Cl | 1.629 | 118 |
| —NHCO—⟨phenyl⟩—Br | 1.647 | 134 |
| —NHCO—⟨phenyl⟩—CN | 1.677 | 138 |
| —NHCO—⟨phenyl⟩ | 1.634 | 114 |

TABLE III-continued

| R | Refractive index | Tg (in C) |
|---|---|---|
| 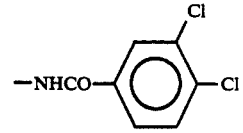 | 1.649 | 127 |
| 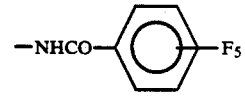 | 1.548 | 123 |
| 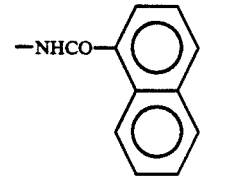 | 1.656 | 133 |
| 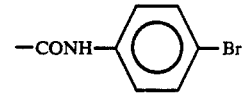 | 1.659 | 136 |
| —CONH—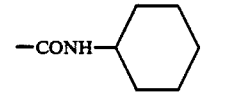 | 1.569 | 150 |
| —NHCOCH$_2$C(CH$_3$)$_3$ | 1.537 | 112 |
| —NHCOCH$_2$CH$_2$CH$_3$ | 1.572 | 78 |
| —NHCOCF$_2$CF$_2$CF$_3$ | 1.472 | 60 |
| 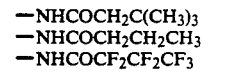 | 1.548 | 99 |
| 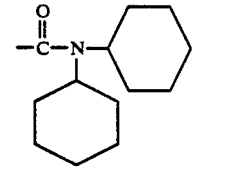 | 1.545 | 86 |
| 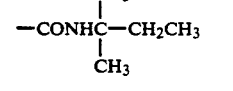 | 1.660 | 128 |

Phenylindan compounds can also be used as mixtures, for example, a mixture of the three compounds in Table III

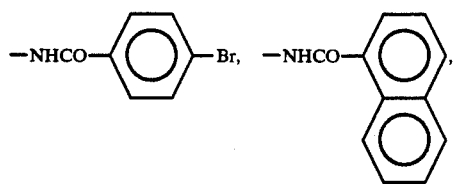

and in which R is

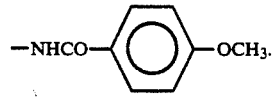

Exemplary phthalimide compounds are disclosed in U.S. Pat. No. 4,971,426, issued Nov. 20, 1990 to Schildkraut et al.

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

In a particular embodiment of the invention, the polymer used was 4'-[(6-acryloyloxyhexyl)methylamino]-4-methylsulfonylazobenzene homopolymer (also referred to herein as Polymer A). Polymer A has the structural formula:

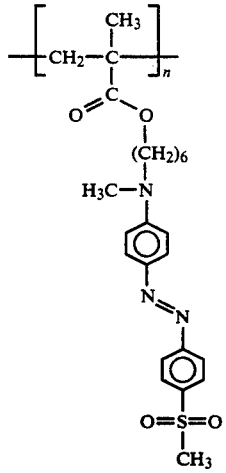

Polymer A has nonlinear optical properties after poling and is optically passive unless poled.

Waveguide layer 16 can be prepared by a variety of procedures, however, spin coating is preferred. Different procedures can be followed in spin coating. For example, spin coating can include annealing, in which blank 10 is baked to drive off solvent prior to poling, or spin coating and poling may be a combined operation, in which the polymer is spun and is then poled before the polymer is solidified. Details of procedures for fabricating waveguide films are well known to those skilled in the art.

Base 14 can be any of a variety of materials and configurations. Base 14 provides physical support and is selected on the basis of overall ability to withstand both the manufacture and use of poled polymer stripe waveguide 24 without loss of physical integrity or unacceptable degradation of performance. Base 14 can be uniform or, alternatively, can include a discrete buffer layer (not shown) of a different material than the remainder of base 14 to optically buffer guide member 16 from adjacent metallic or high refractive index dielectric structures. Base 14 can be selected from a wide variety of materials, in a wide variety of forms such as monocrystalline and polycrystalline solids and composites. Examples of suitable materials include: silicon, quartz ($SiO_2$), silicon nitride, magnesium oxide (MgO(xtal)), strontium titanate, germanium, gallium arsenide, alumina (polycrystalline $Al_2O_3$ or sapphire), and metals. Base 14 can be shared with other components. For example, a convenient base is a silicon chip, which includes a discrete low index $SiO_2$ base buffer layer, one to three micrometers thick, to optically isolate the guided wave from the high index silicon. This base can optionally include integrated electronic components, such as detectors, amplifiers, drivers, and the like (not shown), formed in the silicon.

In a particular embodiment of the invention, a lower electrode 26 is disposed on base 14. Lower electrode is illustrated on the bottom of base 14 in FIG. 1, however, lower electrode can be disposed between base 14 and waveguide layer 16, if optical buffering of waveguide layer is preserved. Lower electrode 26 can carry a charge during poling. Lower electrode 26 can be a layer of deposited metal or conductive metal oxide or other conductive material. For example, a layer of gold, nickel, copper, or indium tin oxide. Electrode layer 26 can be deposited on base 14 in a variety of manners, such as screen printing, photolithography or sputtering or can be adhered or can be dispensed with in favor of an alternative charge carrier, such as a portion of base 14. It is generally convenient to provide lower electrode 26 prior to the preparation of waveguide layer 16. Lower electrode 26 can be removed after poling, if expedient, or can be retained as an artifact or can be utilized in the finished polymer stripe waveguide 24 for another purpose. If appropriate for a particular use, an upper electrode (not shown) can be positioned over waveguide layer 16, however, it may be necessary to first impose an optical buffer to separate waveguide layer 16 and upper electrode. Upper electrode is removed after poling.

In a particular embodiment of the invention, waveguide layer is electrically poled by heating waveguide blank, in an inert atmosphere, to just above the $T_g$ of the waveguide polymer, applying a plasma charge on the surface of waveguide layer and an opposite charge on electrode layer until molecular alignment of waveguide polymer occurs, and then cooling to below the $T_g$ while maintaining the electrical field across planar waveguide. Electric poling can alternatively be performed by a variety of procedures well known to those skilled in the art using conventional equipment. A pair of opposed, conductive electrodes may be utilized, or one or both electrodes may be dispensed with in favor of a corona discharge, that is, an electrostatic charge imposed by a plasma on the respective surface of waveguide blank. If an upper electrode would be used, it would be preferred that the upper electrode be removed, without damage to polymer layer, prior to the laser ablation. The voltage drop between the charged surfaces during poling depends upon factors such as the polymer material used and spacing of electrodes, but is generally between about 80 Volts and about 200 Volts per micrometer of separation of charged surfaces. After poling the poled polymer has a uniaxially aligned layer which has associated with it an $r_{33}$ which is directly related to the degree of alignment and the constituents of the organic chromophore. Electrically poled waveguide layer can be uniformly or non-uniformly poled, as desired for a particular product. Methods for non-uniformly poling a planar waveguide are well known to those skilled in the art.

The laser utilized in the laser photoablation provides an ultraviolet beam at a wavelength less than about 350 nanometers. A wavelength as low as the vacuum ultraviolet range, less than about 150 nanometers, can be used, however, the absorption of vacuum UV light by air must then be taken into account. It is believed that the rate of material removal by the photoablation step of the methods of the invention is increased if oxygen is present.

In the embodiment of the methods of the invention disclosed in FIG. 1, differences were not seen in the rate of photoablation of waveguide polymer and in the stripe polymer waveguides produced for both ArF and KrF excimer lasers having respective wavelengths of 193 and 248 nanometers. It is therefore theorized that the methods of the invention are independent of the wavelength of the laser used. This result is surprising in that photoablation having a high rate of polymer removal has been stated in publications in the art, such as U.S. Pat. No. 4,414,059 to Blum et al as being dependent upon the wavelength of the laser used. Photoablation having no such wavelength dependence has been described, for example in U.S. Pat. No. 4,414,059, however, that photoablation process is described as being very slow.

A non-preferred embodiment of the methods of the invention utilized an Ar ion laser used to pump a dye laser, which generated 2.5 milliWatts of continuous wave optical power at a wavelength of 258 nanometers with a beam diameter focused to about 2 micrometers. This laser beam necessitates scanning, which was performed with dwell times between 1 millisecond and 500 milliseconds.

In the preferred embodiment of the methods of the invention of FIG. 1, KrF and ArF excimer lasers were used, which provided beams pulsed at a pulse rate greater than about 5 pulses per second and less than about 100 pulses per second. A slower or faster pulse rate causes very uneven removal of the ablated surface, which would degrade the shape of a stripe waveguide. The slower pulse rate is believed to cause uneven removal of polymer layer due to uneven heating. The faster pulse rate is believed to cause melting of polymer layer due to inadequate cooling. It is believed that the scanning utilized with a continuous wave laser, as discussed above, provides an effect roughly equivalent to use of a pulsed beam. The claimed inventions are not limited, however, by any theory or belief expressed herein which is not specifically claimed.

Each laser pulse has an intensity of at least about 15 milliJoules per square centimeter ($mJ/cm^2$) or, more desirably more than about 30 $mJ/cm^2$. It is desirable that the dimensions of the cross-section of beam be larger than the corresponding dimensions of waveguide blank, so as to eliminate any need for scanning, and that the intensity of beam be uniform throughout the cross-section of beam. It is desirable that laser have an available beam energy well in excess of the minimum beam energy used in the methods of the invention. This permits laser beam mixing to be used to achieve a uniform intensity distribution across the beam. Excimer lasers are commercially available which can provide a laser beam having a uniform intensity distribution at 30 mJ over an area of 10 millimeters by 40 millimeters, even after 90 percent losses during laser beam mixing.

Mask is a conventional shadow mask capable of blocking the laser beam, for example, a quartz plate having a deposited chromium pattern or a stainless steel plate. The fabrication of shadow masks is well known to those skilled in the art. Shadow mask is positioned at a separation from waveguide blank to permit clearance of ablation debris. Diffraction effects due to the separation of the mask and the polymer surface results in satellite ridges being formed on either side of the mask shadow. The separation of shadow mask and planar waveguide can be minimized to reduce diffraction effects. Alternatively, the problem can be solved by use of conventional one to one imaging of the mask pattern onto the polymer surface as is well known to those skilled in the art.

The laser forms polymer stripe waveguides by partially or wholly photoablating away the polymer on either side of a central rib. Laser beam may be focused to cause ablation to occur at faster rates, however, both a high ablation rate and a large area coverage are needed. Surprisingly, the use of a focused beam is undesirable. Examples 3–10 show that a weakly focused beam photoablates at a very fast rate, but very unevenly. Profilometry scans of Examples 7–10 are shown in FIGS. 2–5, respectively. The fast rate results in small changes in focus having a very large effect on ablation rate. Examples 3–10 could not be repeated due to an inability to reset the focus with sufficient accuracy. Focus control of the beam thus cannot be used to control ablation depth absent extraordinary measures. A further shortcoming of a focused beam is energy density variations across the beam. This variation is almost gaussian in form and thus the useful area of a full collimated excimer laser beam of about 3 centimeters by 1 centimeter, apertured to 1 centimeter by 1 centimeter, is about 5 millimeters by 10 millimeters. The area of a focused beam is necessarily even smaller.

Accurate control of ablation rate is required for partial ablation. Ablation rates are not uniform. At the beginning of photoablation of the polymer layer, that is, the first 1000 Angstroms, the ablation rate is reduced, it is believed, because of polymer surface effects. At the end of the photoablation of the polymer layer, that is, the last 1000 Angstroms, the ablation rate is also reduced, it is believed due to substrate interference. The photoablation of the last 1000 Angstroms is also complicated by the effect of any unevenness in intensity of the laser beam, which could result in ablation of portions of base before removal of ablation layer can be completed.

Figure 6:
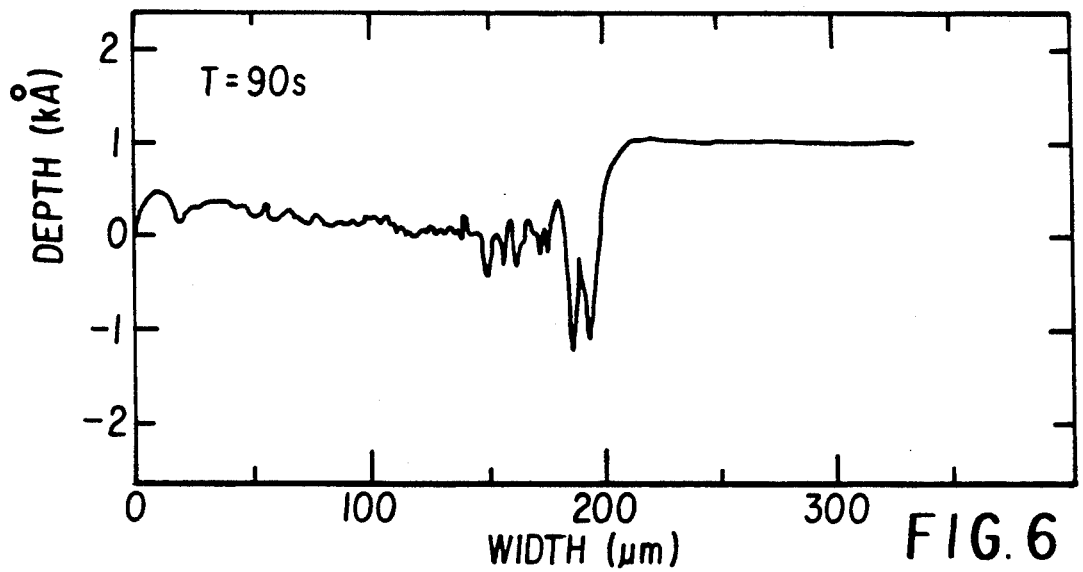
Figure 7:
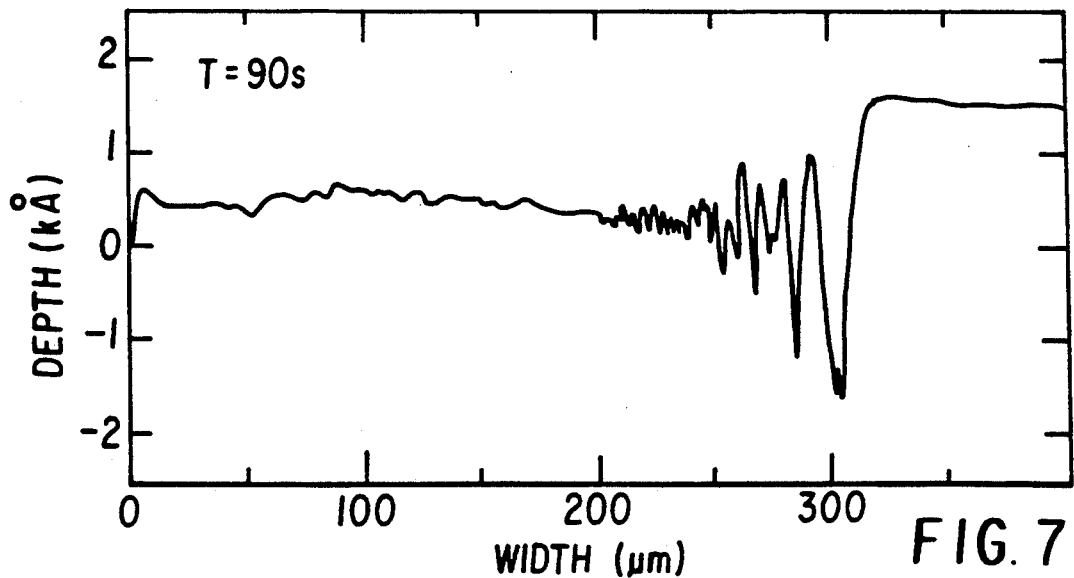

In the method of the invention, time is used as the determinant of ablation depth. Table IV includes data for Examples 16–24, which surprisingly indicates that ablation depth can be controlled much more easily with time, than with excimer laser beam focusing. FIGS. 6–7 show profilometry scans of the resultant profile for Example 16, a 90 second exposure with a collimated beam and for Example 20, a slightly focused beam. Use of the collimated beam gives no visible difference in the ablated surface, however, the ablation rate is about half as great.

If ablation to full depth is needed and a substrate is chosen which is either resistant to photoablation or photoablates cleanly with little redeposition, then the time for the photoablation exposure may be set very broadly. Examples 46–47, were photoablated to full depth and showed minimal undercutting and no widening of the ablated region. If ablation to less than full depth is required, then exposure time must be limited. This may be done by taking test ablations at either end of an expected range of times, assuming a linear relationship between time and average ablation depth, within that range, and extrapolating to the desired ablation depth and time.

It is desirable that the energy density of the laser beam be selected to provide a rate of photoablation between about 1000 Angstroms/minute and about 5000 Angstroms/minute. If necessary, the laser pulse energy can be reduced by inserting an absorber in the path of the beam, such as a quartz cell filled with dilute nitric acid. Table VI, which summarizes Examples 25–51B, shows that for a waveguide layer of Polymer A, a pulse rate of 10 Hz, and a beam area of 10 mm$^2$, the photoablation rate for a pulse energy of 20.7 mJ/cm$^2$ is undesirably slow, a pulse energy of 25.7 mJ/cm$^2$ is undesirably fast and a pulse energy of 22 mJ/cm$^2$ is within a desirable range.

Figure 8A:
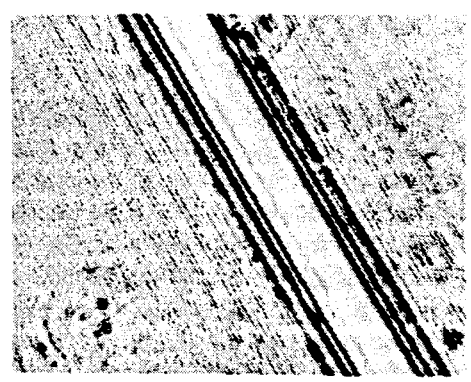
FIGS. 8A-8C show a) an optical micrograph, b) SEM photograph and c) a profilometry scan of the waveguide of Example 50B.
Figure 8B:
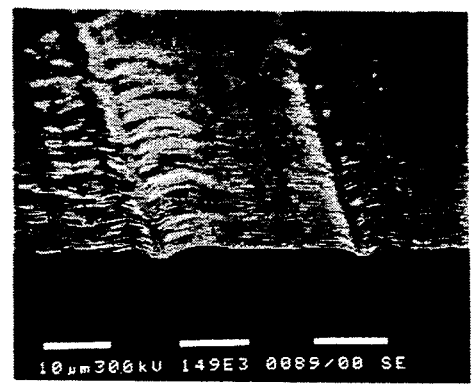
Figure 8C:
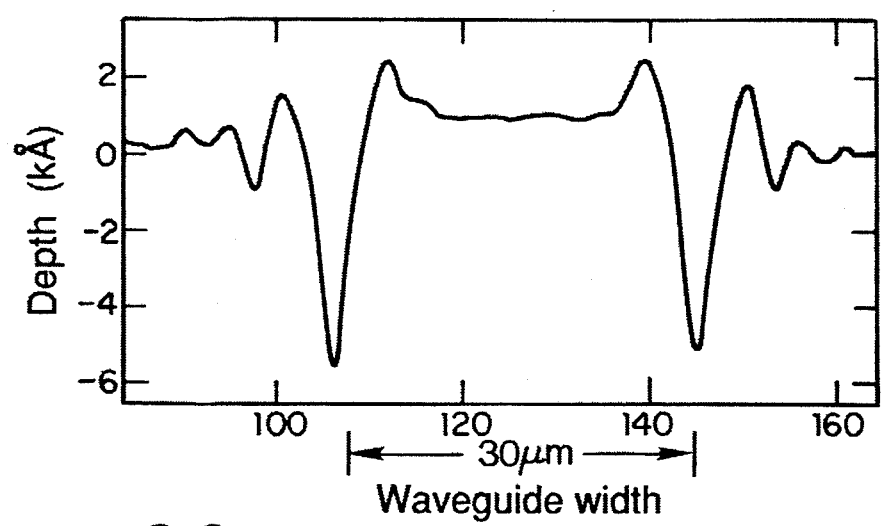
Figure 9:
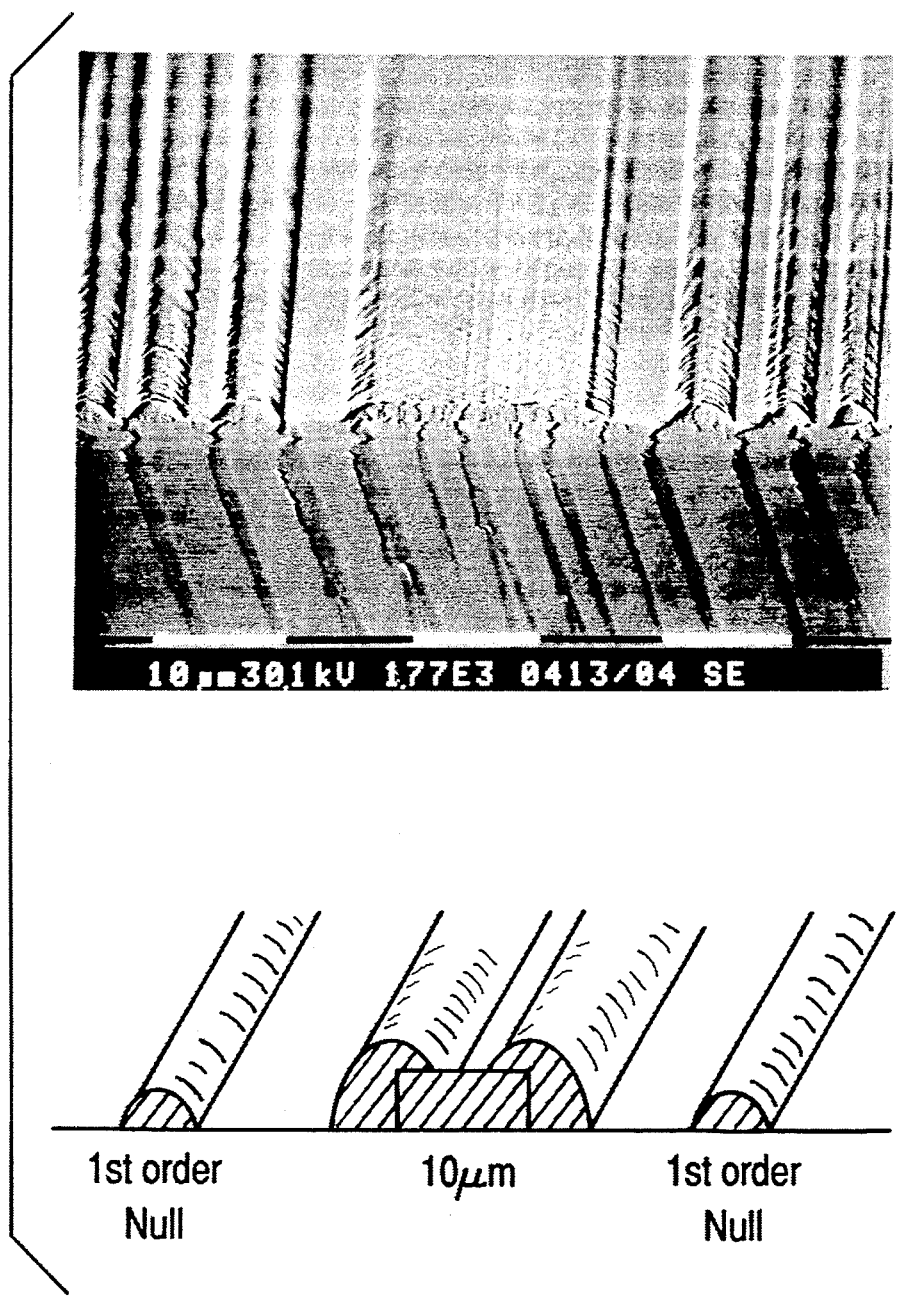
FIG. 9 shows an electron micrograph and line drawing of the cross section of the stripe waveguide of Example 59.
Figure 10:
FIGS. 10-11 show electron micrographs and line drawings of cross-sections of the stripe waveguides of Example 71.
Figure 10:
Figure 11:
Figure 11:

The stripe waveguides produced have dimensions that are limited by the mask used and the mask waveguide blank separation. FIG. 8 shows a) an optical micrograph, b) SEM photograph and c) a profilometry scan of the waveguide of Example 50B, in which the poled Polymer A waveguide layer was ablated for 120 seconds with 22.0 mJ pulses through a mask having 20 micrometer features. The resulting waveguide width was about 30 micrometers. This widening could be due to diffraction of the laser light at the metal mask edge. The lines vary sinusoidally in depth at the sides of the waveguide region. This explanation, however, does not adequately account for the increase in thickness at the waveguide edges. Another possibility is that there is also localized melting and consolidation at the waveguide edges due to the extremely high localised energy density. Redeposited material, however, would not be expected to retain poling. This explanation might lead one to predict that the methods of the invention could not be used to produce stripe poled polymer waveguides, however, surprisingly that is not the case. Applicant theorizes that sinusoidal variation and redeposition are both occurring in the photoablation step. It is surprising that despite the existence of these effects, stripe polymer waveguides having non-linear optical properties are produced by the methods of the invention. FIG. 9 shows an electron micrograph of the cross section of the stripe waveguide of Example 59, in which the mask waveguide separation was 980 micrometers. The central region displayed was located directly beneath the 10 micrometer stripe. The stripes of polymer on either side are intensity nulls in the diffraction pattern initiated by the edges of the photomask. Reducing the mask-waveguide separation reduced diffraction effects. FIGS. 10 and 11 show the polymer waveguides of Example 71. The 10 micrometers wide photomask line shown in FIG. 10, results in an etched polymer pattern which is almost identical to the mask. There is a large clear space between the polymer waveguide and its first order diffraction peak, which has been almost fully etched away. The 3 micrometers wide photomask line, shown in FIG. 11, results in polymer waveguide widths which was also almost identical in width to the mask. There are commercially available systems which routinely image intricate photomask patterns on a 1 to 1 or even 5 to 1 ratio. These systems, used in the electronics industry, could be used to fabricate the stripe polymer waveguides of the invention without diffraction effects.

Figure 12:
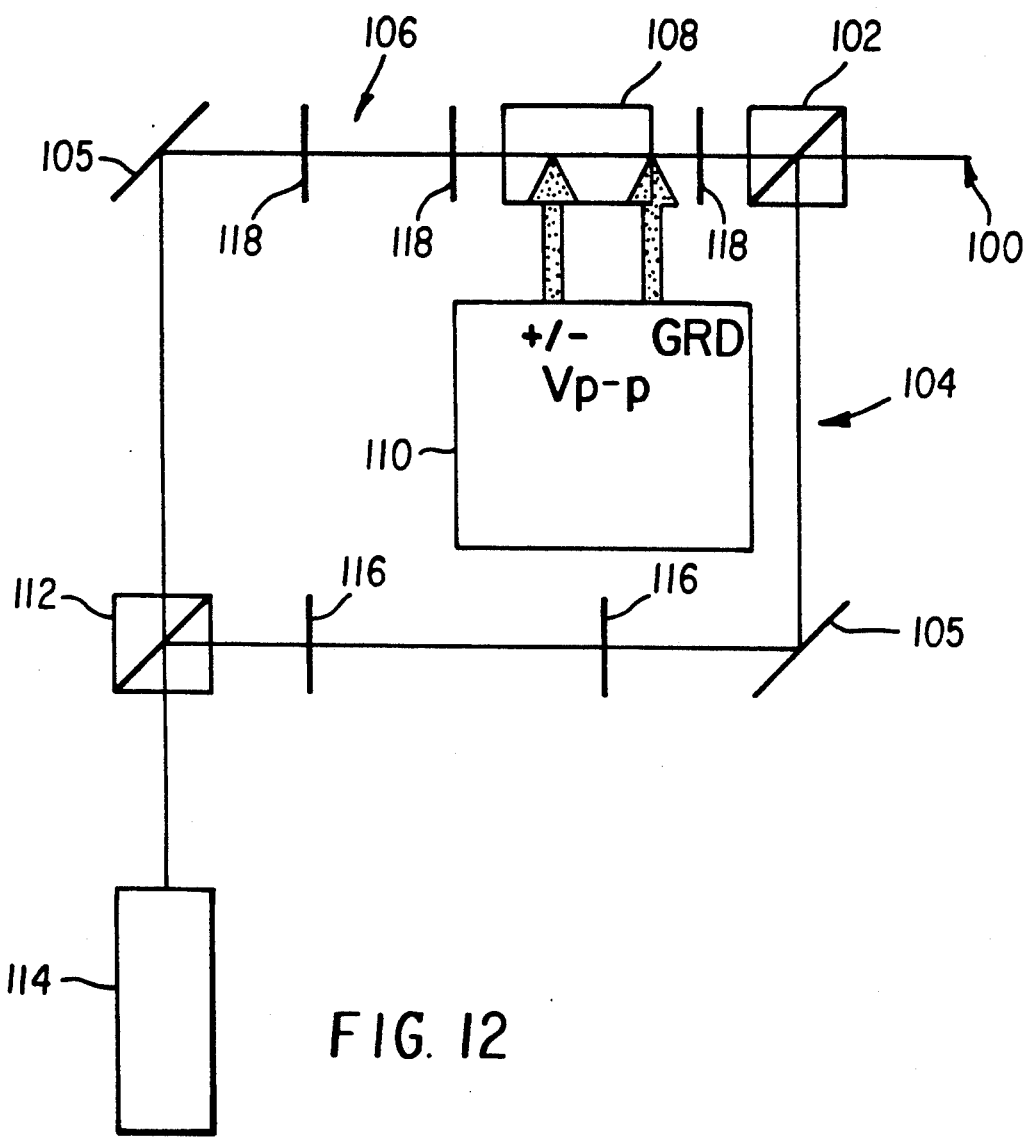
FIG. 12 shows the Mach Zehnder arrangement used, in Examples 73-77, to measure the electro-optic coefficient of non-linear optical waveguides prepared according to the method of the invention.

The stripe polymer waveguides produced by the methods of the invention retain poling despite photoablation. Examples 48A–51B illustrate that poling does not have a discernable effect upon photoablation. Examples 73–77 demonstrate that the stripe polymer waveguides produced demonstate non-linear optical properties. FIG. 12 shows the Mach Zehnder arrangement used, in Examples 73–77, to measure the electro-optic coefficient of the fabricated devices. The beam 100 of a semiconductor laser having a wavelength of 860 nm was divided by a beam splitter 102 into reference and delay arms 104,106, each including a mirror 105. The stripe waveguides 108 were individually placed in the delay arm. One delay arm beam portion was endfire coupled into the stripe waveguide 108. The stripe waveguides 108 were physically repositioned until a fundamental mode was preferentially excited. The other portion of the beam was used as a reference beam. A voltage supplied by a voltage source 110 was applied, between the upper and lower electrodes of stripe waveguide 108 to induce an electro-optic phase shift in the sample arm of the interferometer. This difference in phase is directly related to the shift in light fringes at the output end of the interferometer and can be expressed in terms of applied voltage and electro-optic coefficient by:

$$r_{33} = \lambda / n^3 E_\pi l \Gamma$$

where E is the electric field required to obtain a light to dark (or dark to light) fringe shift, $r_{33}$ is the linear electro-optic or Pockels coefficient of the material, $\pi$ is the wavelength of light in free space, n is the effective refractive index of the guided mode, l is the total length of the electrode and $\Gamma$ is the overlap of the electric and optical fields within the electro-optic media. The relationship between $E_\pi$ and the applied voltage is given by:

$$E_\pi = V_\pi / (t_1 \epsilon_{r1} / \epsilon_{r2} + t_2)$$

where $V_\pi$ is the total applied voltage, $t_1$ is the thickness of the indane buffer layer, $t_2$ is the waveguide thickness of the Polymer A polymer film, and $\epsilon_{r1}$ and $\epsilon_{r2}$ are the relative permitivities of the buffer layer and the waveguide layer, respectively. The beam portions were recombined by a beam combiner 112 and the resulting fringes were measured optically at 114. Neutral filters 116 were placed in reference arm as necessary to reduce the intensity of reference portion of beam to about the intensity of the beam portion exiting delay arm 106. Aperatured plates 118 were used as "mode filters" to approximate single mode transmission in waveguide layer.

The polymer stripe waveguides produced in Examples 73–77 have smaller electro-optic coefficients (also referred to as E-O coefficients or $r_{33}$'s) than the planar waveguides from which they were produced. Poled Polymer A planar waveguides have an electro-optic coefficient between 8–10 pmV. It is believed that the lower $r_{33}$'s were due to the poor overlap of the optical fields and the polymer waveguide core rather than degradation caused by exposure to excimer laser radiation. Practical limitations are presented by the requirements of overlapping the optical field of the propagated light and the stripe waveguide. An estimate of single-mode propagation losses in the poled polymer stripe waveguides of the invention was obtained, by preferentially exciting one mode of the waveguide structure in a 20 micron wide waveguide, to approximate a single mode. An estimate of 10.5 dBcm was obtained by measuring the total input and output coupled laser power. This loss is only an estimate and is comprised of several different loss mechanisms, including: ITO absorption loss, scattering caused by waveguide imperfections, absorption caused by the electrode, field overlap losses at the waveguide ends and scattering caused by poorly cleaved waveguide endfaces.

Figure 13:
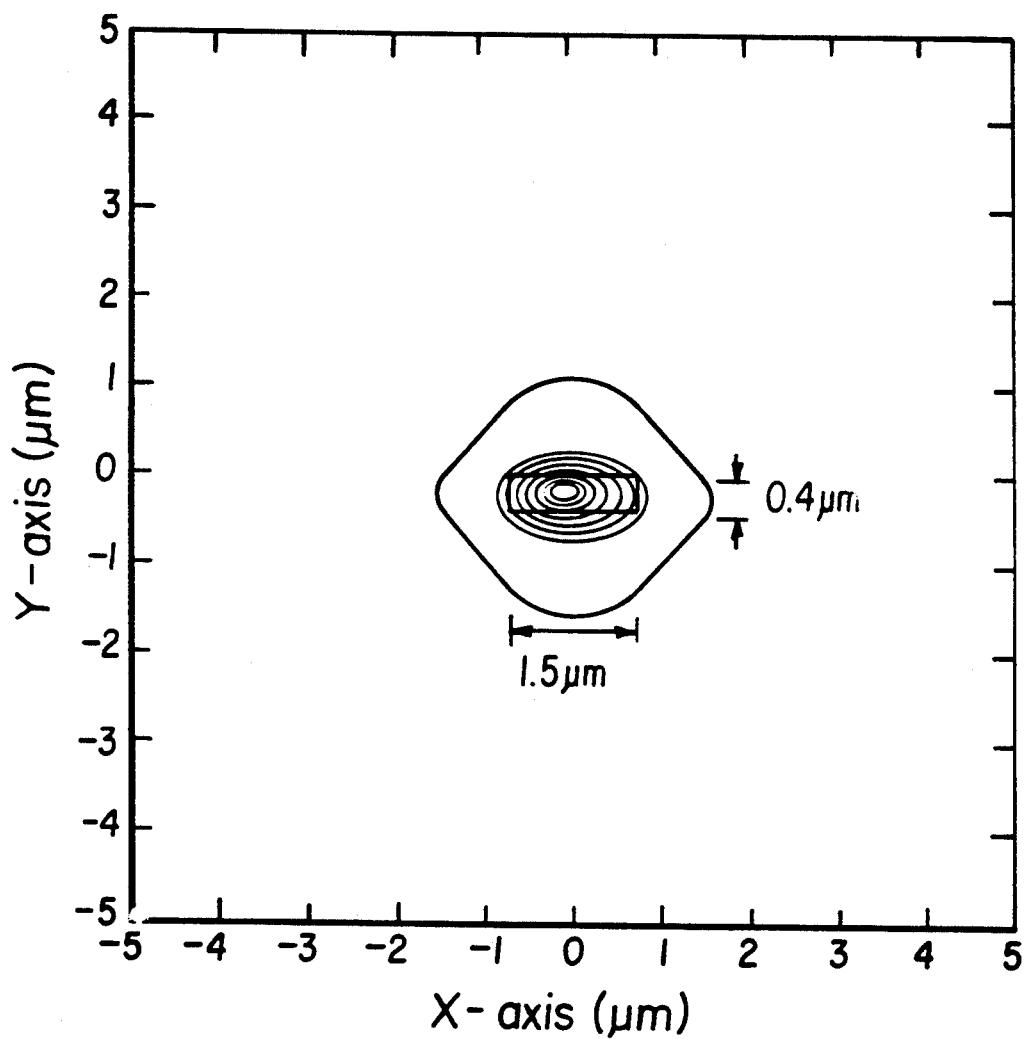
FIG. 13 shows the intensity distribution of a guided wave in a rectangular waveguide which mimics a "singlemode" stripe waveguide. Ten percent intensity contours are shown starting from the −30 dB level.

FIG. 13 shows the intensity distribution of a rectangular waveguide with refractive index 1.59 and substrate index 1.48. The width of 1.5 microns and a thickness or height of 0.4 microns were chosen to mimic a "singlemode" stripe waveguide. The intensity contours, which are 10% contours starting from the −30 dB level and the corresponding waveguide dimensions show that the overlap is only about 67%. If this approximate factor is used in the calculation of $r_{33}$ for Example 77, it becomes 8.8 pmV (instead of 5.89 pmV). The value of 8.8 pmV is much more in line with the measurements of electro-optic coefficient made with planar Polymer A waveguide structures. The intensity contours were calculated by finite difference analysis.

The following procedures describe the preparation of materials and articles discussed herein:

BASE

Base has a p-type Silicon chip over which is layered a 2 micron thickness of $SiO_2$. A lower electrode overlying the $SiO_2$ layer was indium tin oxide (ITO) 15–25 nanometers thick or a layer of gold. Substrates including base and lower electrode are widely available commercially in prepared form. Results with either the ITO or gold electrode layer were indistinguishable.

PREPARATION OF
N-(6-hydroxyhexyl)-N-methylaniline

A mixture of 153 g (1.43 mol) freshly distilled N-methylaniline, 200 g (1.46) 6-chlorohexanol, 200 g (1.45 mol) potassium carbonate, 6 g potassium iodide, and 750 mL n-butanol was heated at reflux under nitrogen with vigorous mechanical stirring for 4 days. The solution was cooled, filtered, and the solvent was removed at reduced pressure. The residue was distilled in vacuo to produce a colorless oil.

PREPARATION OF
4'-[(6-hydroxyhexyl)methylamino]-4-methylsulfonylazobenzene

A stirred suspension of 150 g (0.88) of 4-methylsulfonylaniline in 1 liter of 20% hydrochloric acid at 0 degrees-3 degrees C. was treated dropwise with a solution of 66.5 g (0.96 mol) of sodium nitrite in 200 mL of water. N-(6-hydroxyhexyl)-N-methylaniline 218 g, 1.05 mol) was added slowly, maintaining the temperature below 5 degrees C., and the mixture was stirred for 1 hour. Sodium acetate (119 g, 0.88 mol) was added and stirring was continued for 3 hours. Concentrated ammonium hydroxide (250 mL) was added, and the mixture was stirred for 64 hours. The precipitated product was recrystallized successively from ethanol, from toluene, and then from toluene/isopropanol to produce a red solid.

PREPARATION OF 4'-(6-acryloyloxyhexyl)methylamino]-4-methylsulfonylazobenzene A stirred mixture of 4'-[(6-hydroxyhexyl)methylamino]-4-methylsulfonylazobenzene (20.0 g, 52 mmol), triethylamine (6.3 g, 62 mmol) and dry dichloromethane was treated dropwise with acryloyl chloride (5.6, 62 mmol) in 50 ml of dry dichloromethane at 23 degrees C. under nitrogen. The resulting solution was stirred at 23 degrees C. for 72 hours, and then filtered. The filtrate was washed successively with saturated NaCl, with saturated NHCO3, and with water. The organic layer was dried (MgSO4), and the solvent was removed at reduced pressure to deposit a yellow oil, which was recrystallized from tetrahydrofuran.

PREPARATION OF 4'-(6-methacryloyloxyhexyl)methylamino]-4-methylsulfonylazobenzene A mixture of 141 g (0.362 mol) of 4'-[(6-hydroxyhexyl)methylamino]-4-methylsulfonylazobenzene 37.0 g (0.366 mol) of triethylamine, 400 mg of 3-t-butyl-4-hydroxy-5-methylphenylsulfide (inhibitor), and 500 mL of dry dichloromethane was treated with methacryloyl chloride (52.7 g 0.504 mol) at 0 degrees C. under nitrogen. The reaction mixture was washed with 500 mL of water to remove precipitated triethyamine hydrochloride, then with 500 mL of saturated NHCO3, and finally with 500 mL of water. The organic layer was dried (Na2SO4) and the solvent was removed at reduced pressure to deposit an oil, which crystallized on trituration with hexanes and recrystallized from toluene and then from tetrahydrofuran/hexanes to provide an orange powder.

PREPARATION OF PLANAR WAVEGUIDE LAYERS

The preparation of planar waveguides layers generally followed procedures taught by U.S. Pat. No. 4,900,127, which are summarized as follows.

PREPARATION OF PMMA (Polymethylmethacrylate) PLANAR WAVEGUIDE

Polymethylmethacrylate (3.3 grams) was dissolved in purified 1,2,3-trichloropropane (50 milliliters). The solution was dropped onto the substrate until the substrate was completely covered. The substrate was spun at 500 rpm for 10 seconds and then the speed was increased to 2000 rpm for 60 seconds. The film was then placed in a vacuum oven and heated to 120 degrees C. for about 12 hours to remove residual solvent.

PREPARATION OF INDANE PLANAR WAVEGUIDE

The "indane" waveguide layer was produced by thermal evaporation of the phenylindane compound having the structure

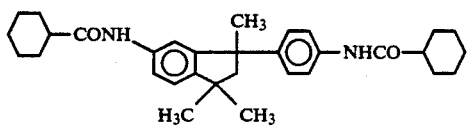

from powder at $10^{-6}$ torr. The evaporation rate was 15-20 Angstroms/second.

PREPARATION OF POLYMER A (4'-[(6-acryloyloxyhexyl)methylamino]-4-methylsulfonylazobenzene homopolymer) PLANAR WAVEGUIDE A solution of 4'-[(6-acryloyloxyhexyl) methylamino]-4-methylsulfonylazobenzene (2.29 g, 5.00 mmol) and 2,2-azobis-(2-methylpropionitrile) (0.042 g, 0.26 mmol) in 10 mL of distilled chlorobenzene was degassed by standard freeze/thaw techniques and then was heated at 60 degrees C. for 48 hours. The product was precipitated into 300 mL of vigorously stirred methanol and purified by reprecipitation from dichloromethane into methanol to obtain 4'-[(6-acryloyloxyhexyl)methylamino]-4-methylsulfonylazobenzene homopolymer.

The 4'-[(6-acryloyloxyhexyl)methylamino]-4-methylsulfonylazobenzene homopolymer (10 percent weight/weight) was dissolved in purified 1,2,3-trichloropropane. The solution was dropped onto the substrate until the substrate was completely covered. The substrate was spun at 500 rpm for 10 seconds and then the speed was increased to 2000 rpm for 60 seconds. The film was then placed in a vacuum oven and heated to 120 degrees C. for about 12 hours to remove residual solvent. A 4'-[(6-acryloyloxyhexyl) methylamino]-4-methylsulfonylazobenzene homopolymer film approximately 1.25 micrometers thick was obtained.

LASER PROCESSING METHOD 1

An Ar ion laser was used to pump a dye laser which generated 3 mW of continuous wave optical power at a wavelength of 258 nanometers. The beam was focused to a diameter of about 2 micrometers on a waveguide blank. The waveguide blank was move linearly relative to the laser beam, by a computer controlled stage. Step sizes, dwell times, and scan lengths can be varied. Scan time is a function of step size and dwell time. For example, a step size of 0.25 micrometers and a scan length of 400 micrometers requires a scan time of 20 minutes.

LASER PROCESSING METHOD 2

The laser used was a LAMBDA PHYSIK EMG 102 MSC XIMER LASER using KrF gas, which produced a collimated pulsed beam having a wavelength of 248 nanometers. The unfocused or collimated beam had a diameter of 100 millimeters and a pulse energy of 42 mJ/cm². A pulse rate of 5 or 10 pulses/second (Hz) was used. The beam was directed at a waveguide blank without focusing or was focused to a smaller diameter.

POLING METHOD

Poling was performed in a corona poling system in a manner well known to those skilled in the art. A plasma field was established on the surface of the planar waveguide and a conductor was connected to lower electrode layer to provide the ground pole of the field. The waveguide blank was heated to just above Tg for Polymer A, 111 degrees C, in an inert atmosphere and maintaining that temperature while applying a voltage drop of 100 Volts/mm. across the planar waveguide. The voltage drop was maintained for 0.5 hours to allow time for alignment of chromophores to stabilize. The waveguide layer was then cooled to below Tg while maintaining the electric field.

LASER PROCESSING METHOD 3

The laser used was an excimer laser using ArF gas, which produced a collimated pulsed beam having a wavelength of 193 nanometers. The unfocused or collimated beam had a size of 3 cm. by 1 cm. and a pulse energy of 300 mJ/cm$^2$ for ArF. The beam was directed at a waveguide blank without focusing.

COMPARATIVE EXAMPLE 1

A PMMA planar waveguide was produced by the procedure above disclosed and an attempt was made to etch a trench or stripe waveguide edge by the above disclosed Laser Processing Method 1. The path of the laser beam on the planar waveguide was 700 microns long and was travelled in 30 minutes, with a dwell time of 400 milliseconds After exposure to the laser beam, the PMMA planar waveguide was examined by optical microscopy and a cross-sectional scan was produced by scanning electron microscopy. The scan did not show a detectable change in the PMMA planar waveguide.

The following examples are presented for a further understanding of the invention:

EXAMPLES 1-2

Figure 14:
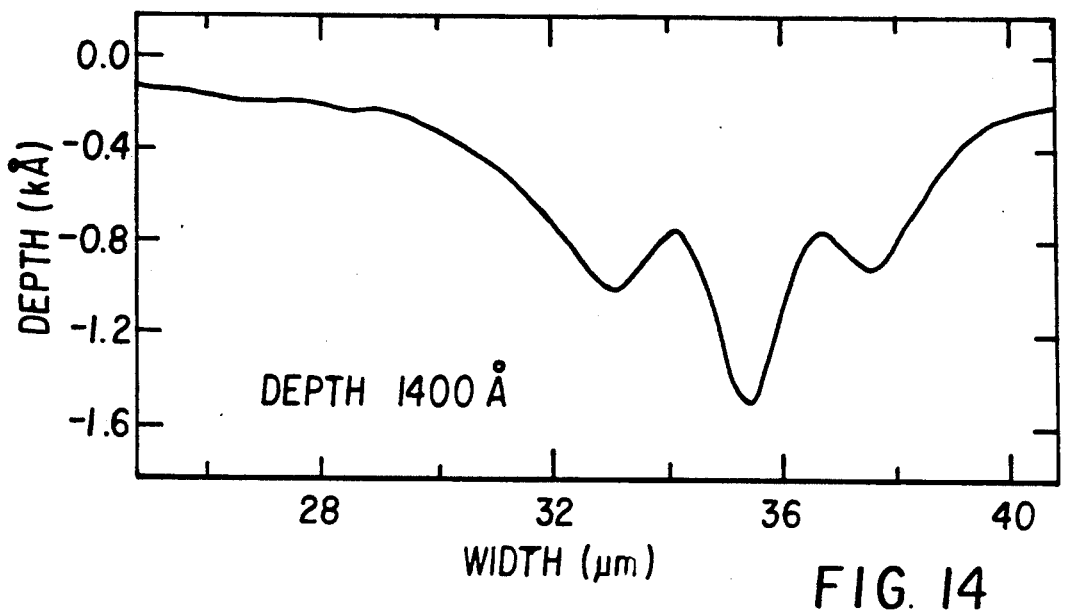
FIGS. 14-15 show profilometry scans of Examples 1 and 2, respectively.
Figure 15:
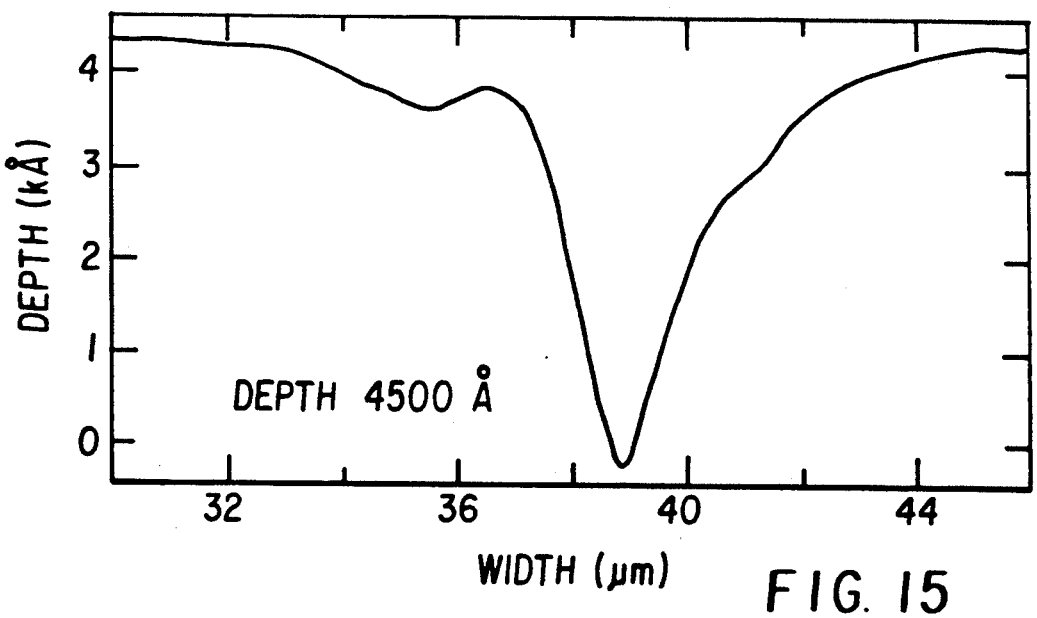

Indane and Polymer A planar waveguides were produced by the procedures above disclosed. A trench was ablated in each planar waveguide and cross-sectional scans of the indane and Polymer B waveguides were performed as in Comparative Example 1. The scanned etch profiles are shown in FIGS. 14–15 for Polymer A and Indane, respectively. A completed stripe waveguide would be produced by repeating Laser Processing Method 1 to provide a second trench. The two trenches would define opposed edges of the stripe waveguide.

EXAMPLES 3-13

PMMA planar waveguides having a thickness of 1 micrometer were prepared as above disclosed and were subjected to Laser Processing Method 2. The waveguide blank was placed on a fixed stage and a stainless steel plate having a matrix of 1 millimeter diameter holes, was placed directly on the waveguide blank as a contact mask. The waveguide blank was irradiated through the mask for 60 seconds with the laser providing a pulse energy of 42 milliJoules (mJ) and a rate of 1 or 10 pulses/second (Hz). The laser beam was focused to smaller spot sizes in order to increase the energy density. Spot sizes, energy densities and average ablation depths are presented in Table IV. Profilometry scans were made as in Example 1. Cross-sectional scans are shown for Examples 7-10 in FIGS. 2-5 and are representative of the other examples. Average ablation depths were determined visually from the ablated depth profiles.

EXAMPLES 14-24

The procedures of Examples 3-13 were repeated with the laser beam focused to provide a 7 or 8 mm$^2$ spot size, or with a collimated beam, which provides a 10 mm$^2$ spot size and a 42 mJ/cm exposure. Profilometry scans were made as in Example 1. Exposure times, energy densities and average ablation depths are presented in Table IV. Cross-sectional scans are shown for Examples 16 and 20 in FIGS. 6-7, which are representative of the other examples. Average ablation depths were determined visually from the scans.

EXAMPLES 25-31

Polymer A planar waveguides having a thickness of about 1.0 micrometer were subject to the same procedures as in Examples 3-13, with a pulse rate of 5 or 10 Hz and an energy density of 42 mJ/cm$^2$. Results are presented in Table V. Ablation rates were found to be very fast at 10 Hz. Ablated surfaces were very uneven at 5 Hz.

EXAMPLES 32-51

Polymer A waveguides having a thickness of 0.94 microns were subject to the same procedures as in Examples 25-27, with the exception that an absorber was placed in the path of the laser beam to reduce energy densities. A quartz cell filled with dilute nitric acid was used as the absorber. The beam was collimated, which provided a 10 millimeter spot size. The pulse rate was 10 Hz. Pulse energies were 20.7 mJ/cm$^2$ or 22.0 mJ/cm$^2$ or 25.7 mJ/cm$^2$ exposure. Energy densities at the waveguides were based on measurements of the beam.

Results of Examples 32-51B are presented in Table V. Ablation rates varied greatly with small changes in energy density. Average ablation rates were calculated graphically for each of the pulse energies. An energy density of 20.7 mJ/cm$^2$ has a very low ablation rate of about 50 Angstroms/minute. An energy density of 25.7 mJ/cm$^2$ has a very high ablation rate of about 7520 Angstroms/minute. An energy density of 22.0 mJ/cm$^2$ has a moderate rate of about 2825 Angstroms/minute.

Figure 16:
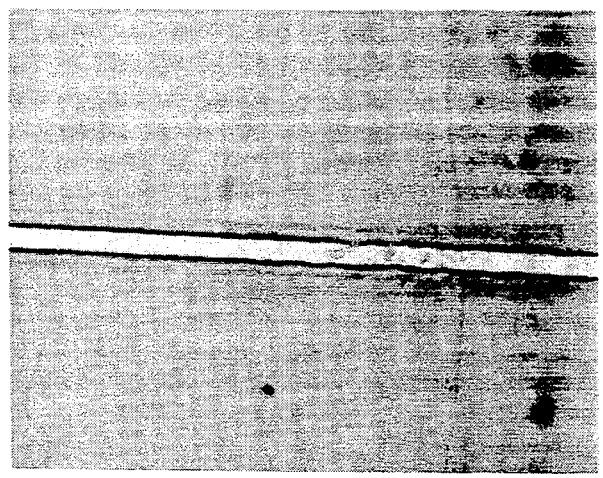
FIGS. 16-17 show optical micrographs and profilometry scans for Examples 46-47, respectively.
Figure 16:
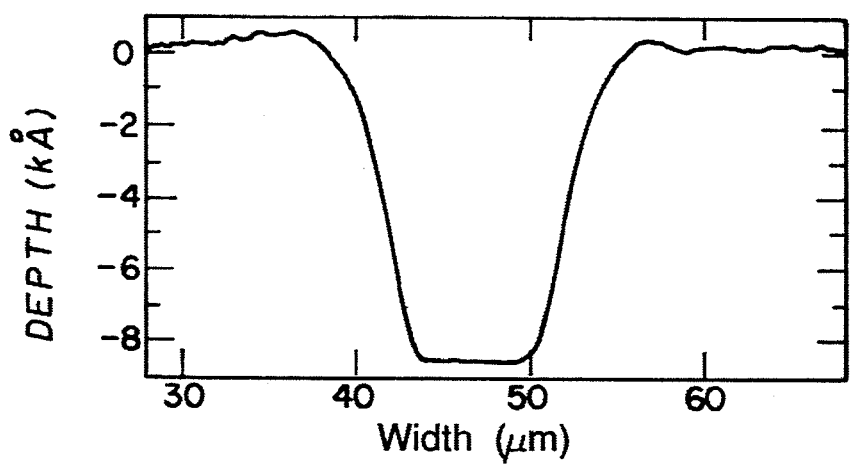
Figure 17:
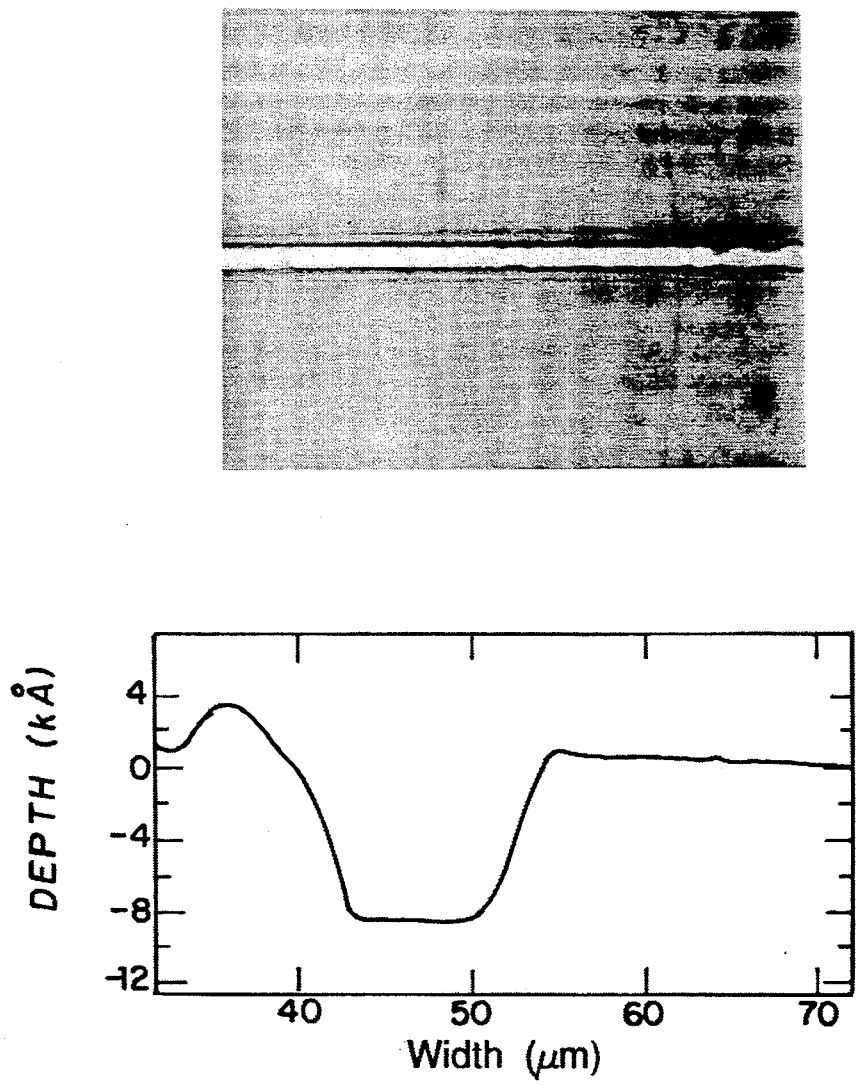

In Examples 46-47, the mask used was a darkfield quartz plate with chromium lines 10 micrometers and 20 micrometers wide, which was held about 1.5 mm above the waveguide layer surface. FIGS. 16-17 show optical micrographs and profilometry scans for the 20 micrometer mask aperture for Examples 46 and 47, respectively. The two profilography scans have different vertical scales. The 10 micrometers aperture showed comparable results.

In each of Examples 48A-51B, two waveguides were prepared, #A and #B. "A" waveguide layers were not poled. "B" waveguide layers were poled by the above-described Poling Method. Photoablation results were indistinguishable for unpoled and poled waveguides of each Example. Results are therefore presented together for "A" and "B" Examples. Examples 48B, 49B, 50B, and 51B were repeated using, as a mask, a lightfield quartz plate, which was the master photomask for the darkfield quartz plate of Examples 46-47. FIG. 8 shows an optical micrograph, scanning electron micrograph and profilometry scan for the 20 micrometer mask aperture of Example 50B, the 120 pulse exposure. The resulting stripe waveguide width was about 30 micrometers wide. The stripe waveguides produced by the other exposure times were comparible in appearance.

EXAMPLES 52-57

Indane planar waveguides, prepared as above disclosed, were subject to the same procedures as in Examples 32-36, with the energy density at 22 mJ/cm$^2$ or 20 mJ/cm$^2$, with the exception that the indane planar waveguide was 1.95 micrometers in thickness and the mask used was a lightfield quartz plate with chromium lines 10 micrometers and 20 micrometers wide which was held about 1 mm above the indane surface. Results are presented in Table VI. Ablation could be detected even after one or two alignment pulses. The ablation depth reached 150 Angstroms after the first two pulses and ablation to the full depth of the indane planar waveguide is indicated by 60 seconds.

EXAMPLES 58–72

Figure 18:
FIGS. 18-20 show photomicrographs of waveguides of Examples 60, 63 and 67, respectively.
Figure 19:
Figure 20:

Unpoled Polymer A waveguides were prepared as above disclosed and exposed to a laser beam using Laser Processing Method 3. A lightfield photomask was used which had chromium stripes patterned from 10.7 mm to 37 mm wide and Y-junction patterns. Spacing between the mask and the polymer surface was accurately measured. Table VII lists results. Photomicrographs and line drawings of the stripe waveguides produced in Examples 59 and 71 are shown in FIGS. 10 and 11, respectively. Photomicrographs of Examples 60, 63 and 67 appear in FIGS. 18–20, respectively. In each of FIGS. 18–20 arrows indicate light paths for a straight waveguide 201 and a Y-junction waveguide 202.

EXAMPLES 73–77

Figure 21:
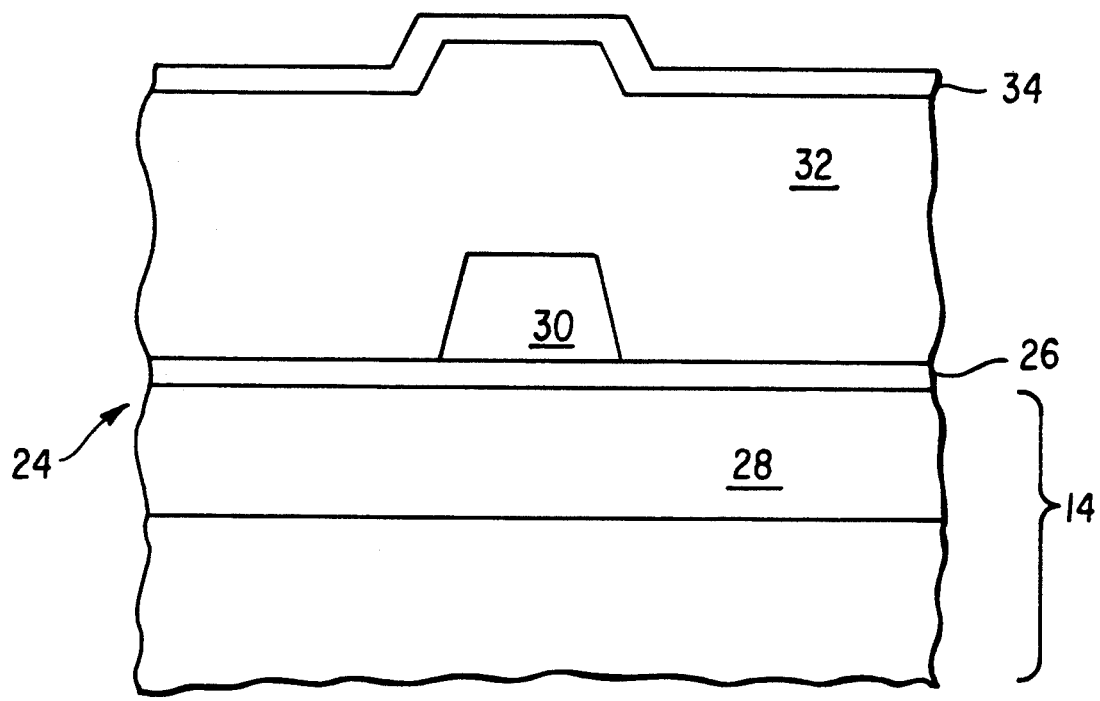
FIG. 21 is a schematic diagram of the waveguide blanks of Examples 48B, 49B, 50B, and 51B.

The procedures of Examples 48–51 "B" were followed, except as discussed below, to produce stripe waveguides having the structure shown in FIG. 21. Stripe waveguides 24 have a lower electrode 26 of 150 Angstrom thick Indium Tin Oxide (ITO) which overlies a base 14. Base includes a 2 micrometers thick SiO buffer layer 28. The waveguide layer of each waveguide blank was photoablated, after poling, to provide a waveguide stripe 30, which overlies lower electrode and has a thickness of 0.94 micrometers. A 2 micron thick indane upper buffer layer 32 was deposited over waveguide stripe 30 and lower electrode 26. A 1000 Agstrom thick gold upper electrode 34 was deposited over upper buffer layer 32 by evaporation. Example 77 used Laser Processing Method 3, in which an ArF excimer laser was used.

The mask used during photoablation was a lightfield quartz plate having chromium lines 10 micrometers and 20 micrometers wide and was held about 1 mm above the waveguide blank surface. Exposure times were 60, 90 or 120 seconds.

The waveguide lengths were around 10 mm with the electrode lengths ranging from 5 mm to 8.5 mm. The waveguide blanks were arranged with discrete optical components to provide the Mach Zehnder interferometer shown in FIG. 12. The beam of a semiconductor laser having a wavelength of 860 nm was divided by a beam splitter into reference and delay arms. The waveguide blanks were individually placed in the delay arm. One delay arm beam portion was endfire coupled into the stripe waveguide. The other portion of the beam was used as a reference beam. A voltage was applied, between the upper and lower electrodes of the sample to induce an electro-optic phase shift in the sample arm of the interferometer. The beam portions were recombined by a beam combiner and the resulting fringes were measured optically. The measured electrooptic coefficients and other information is presented in Table VIII. The data shown in Table VIII were taken at a frequency of 1 Hz. Values of $r_{33}$ were computed using equations 1 and 3. Measurements were taken on a daily basis for a week and show the total variation in data caused by modal interactions (Max, Min). There was no monotonical change in these measurements with time i.e. there was no discernible deterioration in the electro-optic coefficient. Example 73 was measured with all the modes within the waveguide excited. The remaining measurements presented in Table VIII were performed with one mode excited, except Example 77 which is single mode. Since the overlap of the optical field with the electro-optic film varies from mode to mode, the $r_{33}$ values observed were ambiguous. Intermodal spatial interference patterns further complicated the measurement.

TABLE IV

| Example | Pulses (total) | Pulse frequency (Hz) | Energy density (mJ/cm$^2$) | Area (mm$^2$) | Average ablation depth (in nm) |
|---|---|---|---|---|---|
| 3 | 600 | 10 | 42 | 10 | low etch rate |
| 4 | 60 | 1 | 1050 | 2 | very uneven |
| 5 | 60 | 1 | 262.5 | 4 | uneven |
| 6 | 600 | 10 | 262.5 | 4 | etch rate too high |
| 7 | 600 | 10 | 65.6 | 8 | 80 |
| 8 | 600 | 10 | 85.7 | 7 | 230 |
| 9 | 600 | 10 | 116.67 | 6 | 620 |
| 10 | 600 | 10 | 168.0 | 5 | 660 |
| 11 | 600 | 10 | 65.6 | 8 | 95 |
| 12 | 600 | 10 | 69.93 | 7.75 | 100 |
| 13 | 600 | 10 | 74.67 | 7.5 | 120 |
| 14 | 600 | 10 | 79.91 | 7.25 | 230 |
| 15 | 600 | 10 | 85.71 | 7 | 230 |
| 16 | 900 | 10 | 65.6 | 8 | 110 |
| 17 | 1200 | 10 | 65.6 | 8 | 200 |
| 18 | 2400 | 10 | 65.6 | 8 | 590 |
| 19 | 600 | 10 | 42 | 10 | 80 |
| 20 | 900 | 10 | 42 | 10 | 110 |
| 21 | 1200 | 10 | 42 | 10 | 140 |
| 22 | 1800 | 10 | 42 | 10 | 240 |
| 23 | 2400 | 10 | 42 | 10 | 320 |
| 24 | 3600 | 10 | 42 | 10 | 670 |

TABLE V

| Example | Pulses (total) | Pulse frequency (Hz) | Energy density (mJ/cm$^2$) | Beam Area (mm$^2$) | Average ablation depth (in nm) |
|---|---|---|---|---|---|
| 25 | 600 | 10 | 42 | 10 | etch rate too high |
| 26 | 900 | 10 | 42 | 10 | etch rate too high |
| 27 | 1200 | 10 | 42 | 10 | etch rate too high |
| 28 | 225 | 5 | 42 | 10 | very uneven |
| 29 | 300 | 5 | 42 | 10 | very uneven |
| 30 | 375 | 5 | 42 | 10 | very uneven |
| 31 | 450 | 5 | 42 | 10 | very uneven |
| 32 | 600 | 10 | 20.7 | 10 | 10 |
| 33 | 1200 | 10 | 20.7 | 10 | 14 |
| 34 | 1800 | 10 | 20.7 | 10 | 20 |
| 35 | 2400 | 10 | 20.7 | 10 | 24 |
| 36 | 3600 | 10 | 20.7 | 10 | 31 |
| 37 | 600 | 10 | 25.7 | 10 | 62.5 |
| 38 | 600 | 10 | 25.7 | 10 | 62.5 |
| 39 | 600 | 10 | 25.7 | 10 | 62.5 |
| 40 | 900 | 10 | 25.7 | 10 | 105.7 |
| 41 | 1200 | 10 | 25.7 | 10 | 204.3 |
| 42 | 1200 | 10 | 25.7 | 10 | 204.3 |
| 43 | 1500 | 10 | 25.7 | 10 | 716.8 |
| 44 | 1800 | 10 | 25.7 | 10 | 894 |
| 45 | 2400 | 10 | 25.7 | 10 | 902 |
| 46 | 1200 | 10 | 25.7 | 10 | FIG. 16 |
| 47 | 3000 | 10 | 25.7 | 10 | FIG. 17 |
| 48A-B | 600 | 10 | 22 | 10 | 40 |
| 49A-B | 900 | 10 | 22 | 10 | 90 |
| 50A-B | 1200 | 10 | 22 | 10 | 130 |
| 51A-B | 2400 | 10 | 22 | 10 | 695 |

TABLE VI

| Example | Pulses (total) | Pulse frequency (Hz) | Energy density (mJ/cm²) | Beam Area (mm²) | Average ablation depth (in nm) |
|---|---|---|---|---|---|
| 52 | 2-3 | 10 | 22 | 10 | about 15 very uneven |
| 53 | 100 | 10 | 22 | 10 | about 330 very uneven |
| 54 | 300 | 10 | 22 | 10 | about 1000 very uneven |
| 55 | 600 | 10 | 20.7 | 10 | 1950 |
| 56 | 1200 | 10 | 20.7 | 10 | 1950 |
| 57 | 6000 | 10 | 20.7 | 10 | 1950 |

TABLE VII

| Ex. | Pulses (total) | Exposure Time (min) | Energy (mJ/pulse) | Mask spacing (microns) | Diffraction effects |
|---|---|---|---|---|---|
| 61 | 10 | 30 | 33 | 980 | severe |
| 62 | 10 | 60 | 33 | 980 | severe |
| 63 | 10 | 30 | 33 | 980 | severe |
| 64 | 10 | 60 | 33 | 980 | severe |
| 65 | 10 | 30 | 33 | 680 | moderate |
| 66 | 10 | 60 | 33 | 680 | moderate |
| 67 | 5 | 30 | 30 | 290 | slight |
| 68 | 10 | 30 | 30 | 290 | very slight |
| 69 | 5 | 60 | 30 | 290 | slight |
| 70 | 10 | 60 | 30 | 290 | very slight |
| 71 | 5 | 60 | 30 | 290 | slight |
| 72 | 10 | 60 | 30 | 290 | very slight |
| 73 | 10 | 75 | 30 | 290 | very slight |
| 74 | 10 | 90 | 30 | 290 | very slight |
| 75 | 1 | 11 | 170 | 290 | moderate |

TABLE VIII

| Ex | Exposure time to produce waveguide (sec) | Voltage | Phase shifts | Voltage/phase shift | r33 max (pm/V) | r33 min (pm/V) |
|---|---|---|---|---|---|---|
| 76 | 120 | 240 | 4 | 60 | 2.29 | 1.48 |
| 77 | 90 | 200 | 7 | 28.6 | 4.82 | 3.11 |
| 78 | 90 | 150 | 5 | 30 | 4.60 | 2.97 |
| 79 | 60 | 160 | 5 | 32 | 4.31 | 2.78 |
| 80 | 60 | 200 | 13 | 15.4 | | 5.89 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing a polymer stripe waveguide comprising preparing a planar polymer waveguide blank and photoablating the outline of said stripe waveguide in said waveguide blank.

2. The method of claim 1 further comprising poling said planar polymer waveguide.

3. The method of claim 1 wherein said photoablating further comprises disposing a shadow photomask between said waveguide blank and a laser beam source, and directing a collimated laser beam through said photomask.

4. The method of claim 3 further comprising attenuating said laser beam to provide a rate of photoablation of said waveguide blank from about 1000 to about 5000 Angstroms/minute.

5. The method of claim 4 wherein said laser beam has a wavelength of less than 400 nanometers and said shadow mask comprises x-ray opaque material disposed on a quartz support.

6. The method of claim 5 wherein said laser has a pulse rate between 5 and 100 pulses per second.

7. A method for preparing a poled polymer stripe waveguide comprising preparing a polymer waveguide blank, electric field poling said polymer waveguide blank, and photoablating the outline of said stripe waveguide in said waveguide blank.

8. The method of claim 7 wherein said photoablating further comprises disposing a shadow mask between said waveguide blank and a laser beam source, and directing a collimated laser beam through said photomask.

9. The method of claim 8 wherein said laser beam has a wavelength of less than 400 nanometers and a pulse rate between 5 and 100 pulses per second, and said shadow mask comprises x-ray opaque material disposed on a quartz support.

10. The method of claim 10 wherein said laser has a pulse rate between 5 and 100 pulses per second.

11. The method of claim 10 wherein said waveguide blank includes a polymeric medium exhibiting a second order polarization susceptibility greater than $10^{-9}$ esu and having organic molecular dipoles containing an electron donor moiety linked through a conjugated x bonding system to an electron acceptor.

12. The method of claim 8 wherein said waveguide blank includes 4'-[(6-acryloyloxyhexyl) methylamino]-4-methylsulfonylazobenzene.

13. A method for patterning a waveguide layer comprising photoablating an outline in said waveguide layer using a collimated laser beam, said laser beam having a wavelength of less than about 400 nanometers, a pulse rate between 5 and 100 pulses per second, and a beam energy at said waveguide blank greater than about 15 mJ/cm².

14. The method of claim 13 further comprising the step of electric field poling said waveguide layer prior to said photoablating step, whereby said polymer stripe waveguide produced is electric field poled.

15. The method of claim 13 further comprising limiting the duration of said photoablating step to a time interval preselected as correlating with a desired ablation depth.

16. The method of claim 13 wherein said laser pulse rate is about 10 pulses per second.

17. The method of claim 13 wherein said waveguide layer includes a polymeric medium exhibiting a second order polarization susceptibility greater than $10^{-9}$ esu and having organic molecular dipoles containing an electron donor moiety linked through a conjugated $\pi$ bonding system to an electron acceptor.

18. The method of claim 13 wherein said photoablation of said outline is to less than the full depth of said waveguide layer.

* * * * *